(12) United States Patent
Terumoto et al.

(10) Patent No.: US 11,428,833 B2
(45) Date of Patent: Aug. 30, 2022

(54) EARTHQUAKE SENSING MODULE AND EARTHQUAKE SENSING SYSTEM

(71) Applicant: Rohm Co., Ltd., Kyoto (JP)

(72) Inventors: Koji Terumoto, Kyoto (JP); Noriyuki Jitosho, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 749 days.

(21) Appl. No.: 16/344,125

(22) PCT Filed: Sep. 14, 2017

(86) PCT No.: PCT/JP2017/033323
§ 371 (c)(1),
(2) Date: Apr. 23, 2019

(87) PCT Pub. No.: WO2018/079126
PCT Pub. Date: May 3, 2018

(65) Prior Publication Data
US 2021/0293981 A1 Sep. 23, 2021

(30) Foreign Application Priority Data
Oct. 28, 2016 (JP) .............................. JP2016-211615

(51) Int. Cl.
*G01V 1/00* (2006.01)
*H01R 13/66* (2006.01)
*H01R 13/713* (2006.01)
*H01R 25/00* (2006.01)

(52) U.S. Cl.
CPC ......... *G01V 1/008* (2013.01); *H01R 13/6683* (2013.01); *H01R 13/713* (2013.01); *H01R 25/006* (2013.01)

(58) Field of Classification Search
CPC .. G01V 1/008; H01R 13/6683; H01R 13/713; H01R 25/006
See application file for complete search history.

(56) References Cited

U.S. PATENT DOCUMENTS

| | | | | |
|---|---|---|---|---|
| 6,970,277 | B1* | 11/2005 | Makishima | G01P 1/127 396/53 |
| 8,616,054 | B2* | 12/2013 | Paros | G01V 1/184 73/382 G |
| 9,366,770 | B2* | 6/2016 | Kachi | G01V 1/008 |
| 10,613,240 | B2* | 4/2020 | Ueda | G01V 1/162 |

(Continued)

FOREIGN PATENT DOCUMENTS

| | | |
|---|---|---|
| JP | 3041360 U | 7/1997 |
| JP | 10-144409 A | 5/1998 |
| JP | 2006-10520 A | 1/2006 |

(Continued)

OTHER PUBLICATIONS

International Search Report issued in PCT/JP2017/033323, dated Nov. 28, 2017 (2 pages).

*Primary Examiner* — Elias Desta
(74) *Attorney, Agent, or Firm* — Hamre, Schumann, Mueller & Larson, P.C.

(57) ABSTRACT

An earthquake sensing module includes an acceleration sensor configured to detect accelerations on a plurality of detection axes, a module control unit configured to control the acceleration sensor, and a module storage unit configured to store state information of the acceleration sensor.

24 Claims, 17 Drawing Sheets

(56) References Cited

U.S. PATENT DOCUMENTS

2007/0279239 A1   12/2007  Lachenit et al.
2014/0291064 A1* 10/2014  Sun ........................ G01V 1/008
                                                        181/108

FOREIGN PATENT DOCUMENTS

| JP | 2008-139266 A | 6/2008 |
| JP | 2008-522140 A | 6/2008 |
| JP | 2011-159618 A | 8/2011 |
| JP | 2012-18033 A  | 1/2012 |
| JP | 2013-108755 A | 6/2013 |
| JP | 2014-77645 A  | 5/2014 |
| JP | 2014-161213 A | 9/2014 |
| JP | 2016-133445 A | 7/2016 |

* cited by examiner

FIG.11
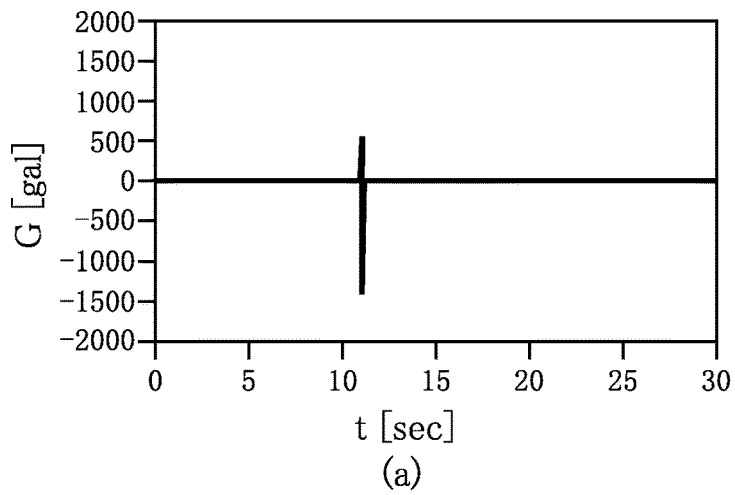
(a)
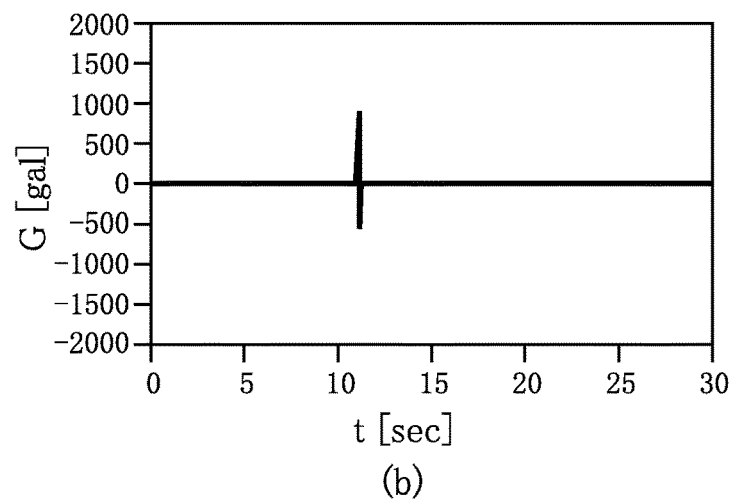
(b)
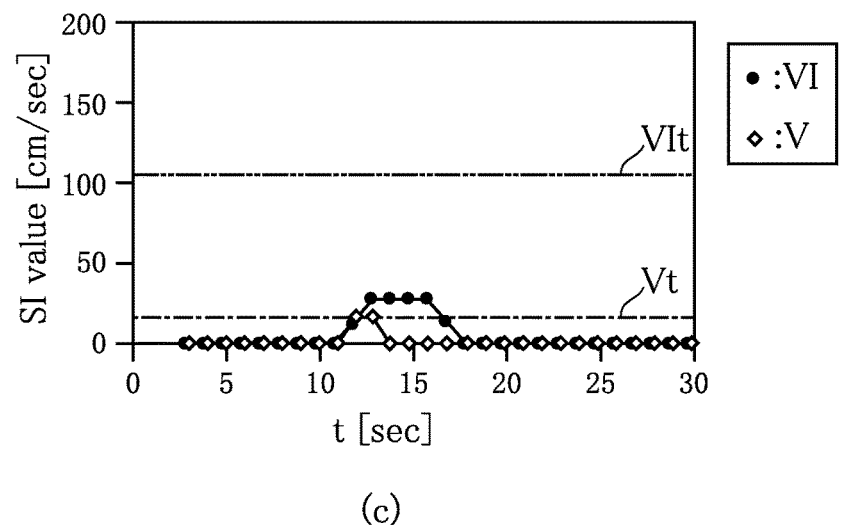
(c)

FIG.12
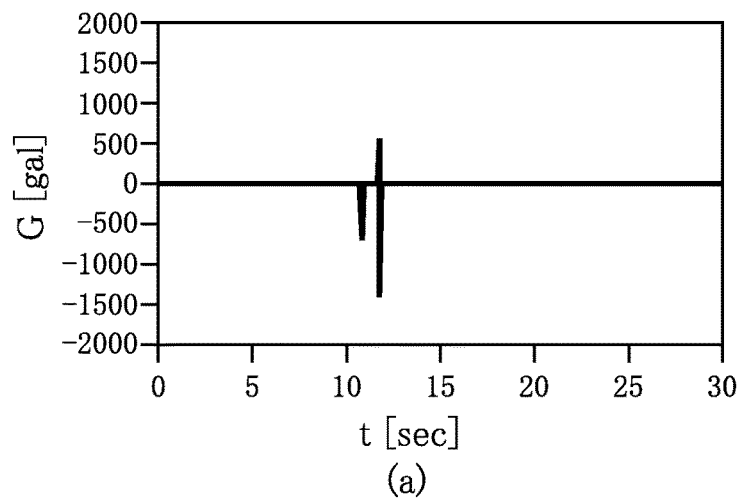
(a)
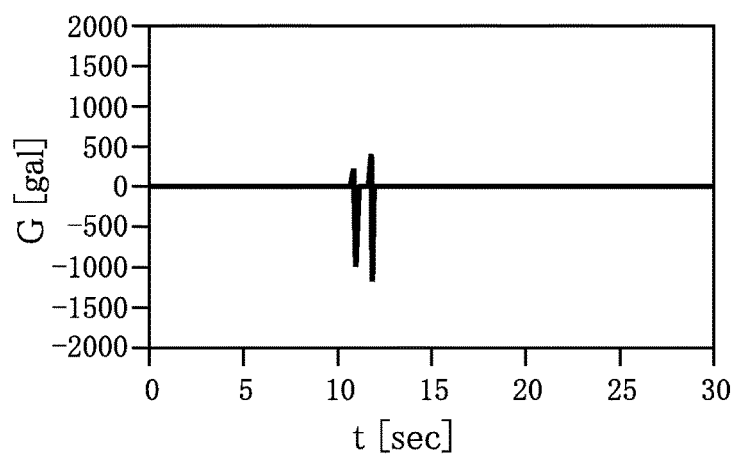
(b)
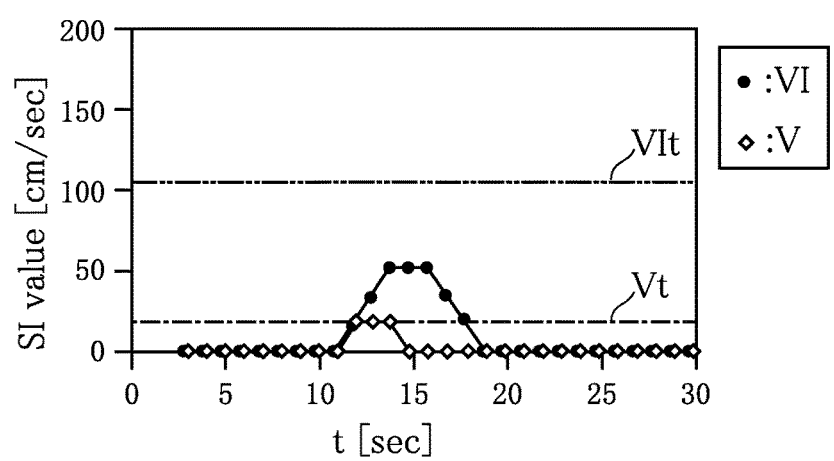
(c)

FIG.13
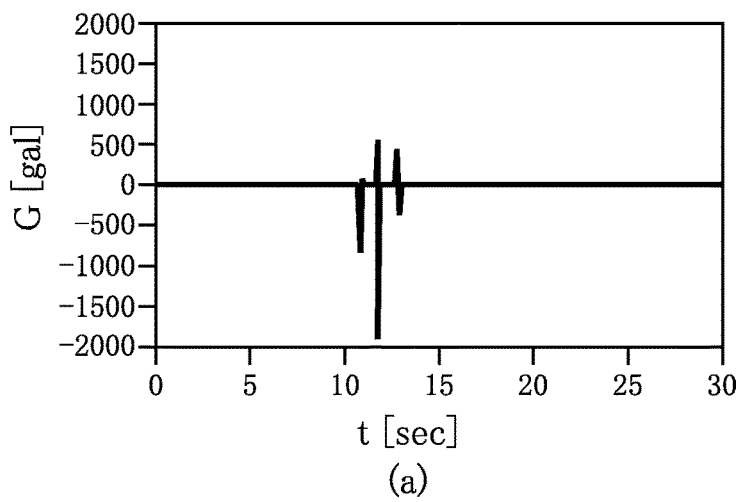
(a)
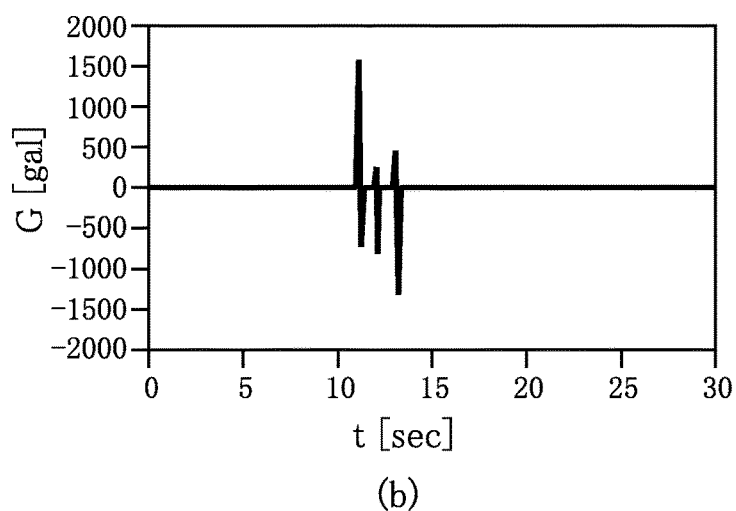
(b)
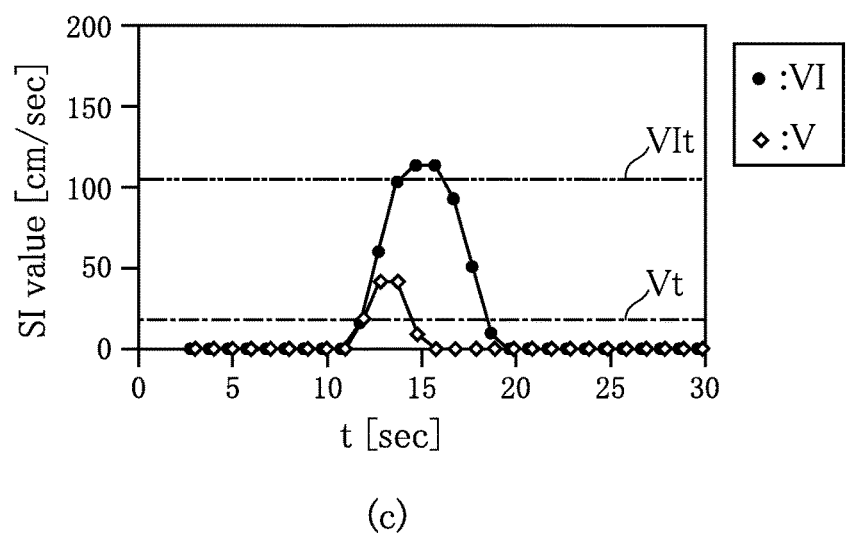
(c)

FIG.14
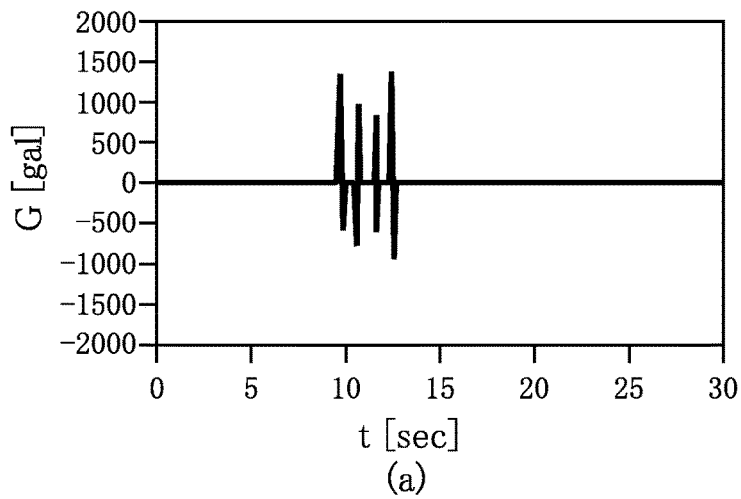
(a)
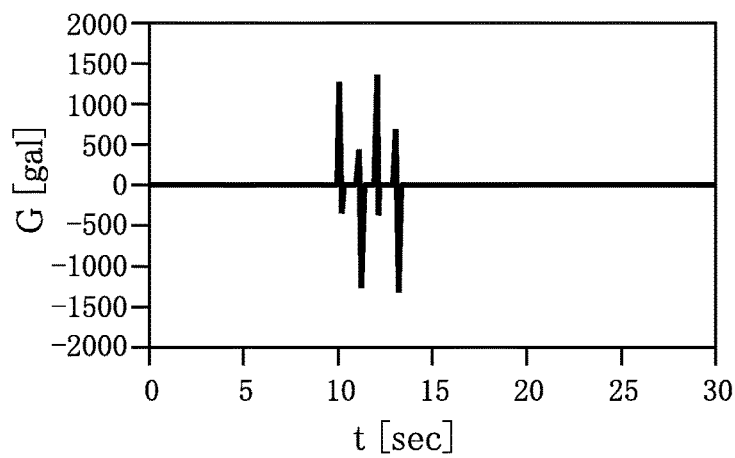
(b)
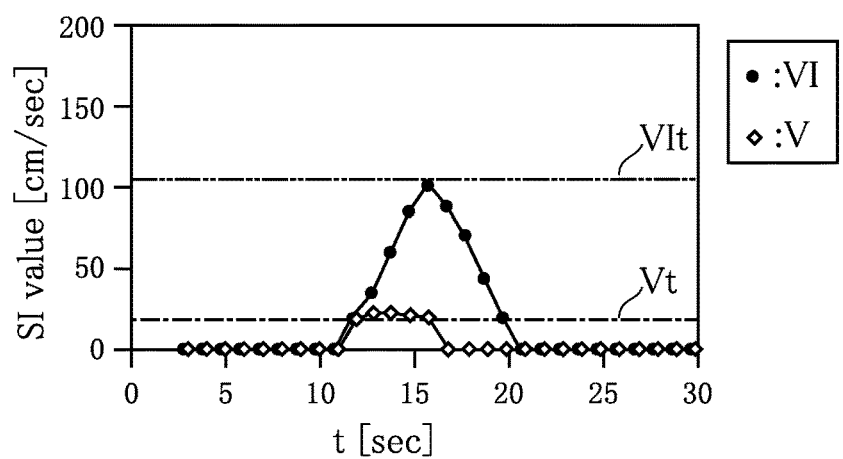
(c)

EARTHQUAKE SENSING MODULE AND EARTHQUAKE SENSING SYSTEM

TECHNICAL FIELD

The present disclosure relates to an earthquake sensing module and an earthquake sensing system.

BACKGROUND ART

It is desired that a breaker or power outlet, which is an electricity receiving portion for publicly-used electrical power, suitably cuts off the power supply when an earthquake occurs. Patent Document 1 discloses an earthquake sensing system using a conventional earthquake sensing module. The earthquake sensing system disclosed in Patent Document 1 uses a so-called pendulum-type earthquake sensor. The pendulum-type earthquake sensor has a portion that swings mechanically due to the vibration of the earthquake. Cutoff of the power is executed using this mechanical swinging.

In recent years, from the viewpoint of preventing secondary disasters during the occurrence of an earthquake, for example, it has been desired that an earthquake sensing system is employed in more breakers and power outlets. For this reason, it is predicted that more earthquake sensors will be provided in the future. The greater the number of earthquake sensors is, the greater the benefit of adding higher-level earthquake sensing processing and other functions using the earthquake sensors is.

PRIOR ART DOCUMENTS

Patent Document

Patent Document 1: JP 2011-159618A

SUMMARY OF INVENTION

Problems to be Solved by Invention

The present disclosure has been presented in view of the foregoing circumstances, and aims to provide an earthquake sensing module and an earthquake sensing system according to which higher functionality can be achieved.

Means for Solving Problem

An earthquake sensing module provided by a first aspect of the present disclosure is an earthquake sensing module including an acceleration sensor configured to detect accelerations on a plurality of detection axes, the earthquake sensing module including: a module control unit configured to control the acceleration sensor; and a module storage unit configured to store state information of the acceleration sensor.

An earthquake sensing system provided by a second aspect of the present disclosure includes: a plurality of earthquake sensing apparatuses each including the earthquake sensing module provided by the first aspect of the present invention; a communication network through which the plurality of earthquake sensing modules are connected; and a system control unit that is connected to the communication network.

The present disclosure will become clearer through detailed description given below with reference to the accompanying drawings.

BRIEF DESCRIPTION OF DRAWINGS

FIG. 11 is a graph showing an example of operations of the earthquake sensing module based on the first embodiment of the present disclosure.

FIG. 12 is a graph showing an example of operations of the earthquake sensing module based on the first embodiment of the present disclosure.

FIG. 13 is a graph showing an example of operations of the earthquake sensing module based on the first embodiment of the present disclosure.

FIG. 14 is a graph showing an example of operations of the earthquake sensing module based on the first embodiment of the present disclosure.

MODE FOR CARRYING OUT INVENTION

Hereinafter, preferred embodiments of the present disclosure will be described with reference to the drawings.

FIGS. 1 to 7 show an earthquake sensing module, an earthquake sensing apparatus, and an earthquake sensing system based on a first embodiment of the present disclosure.

Figure 1:
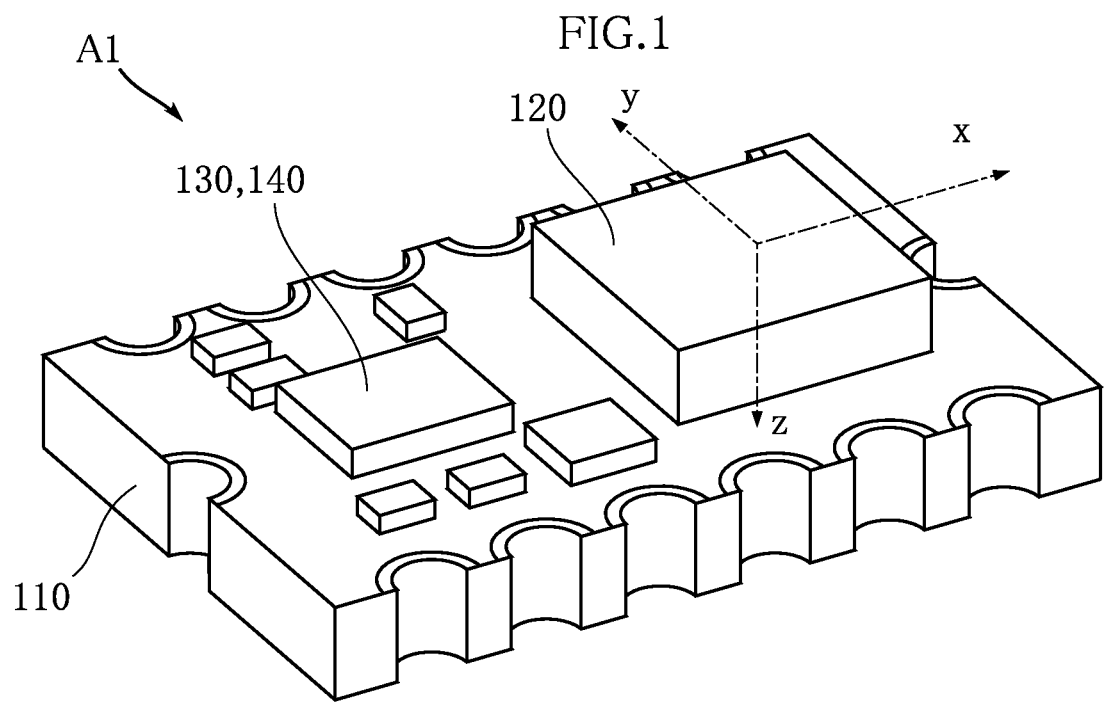
FIG. 1 is a schematic diagram showing an earthquake sensing module based on a first embodiment of the present disclosure.
Figure 2:
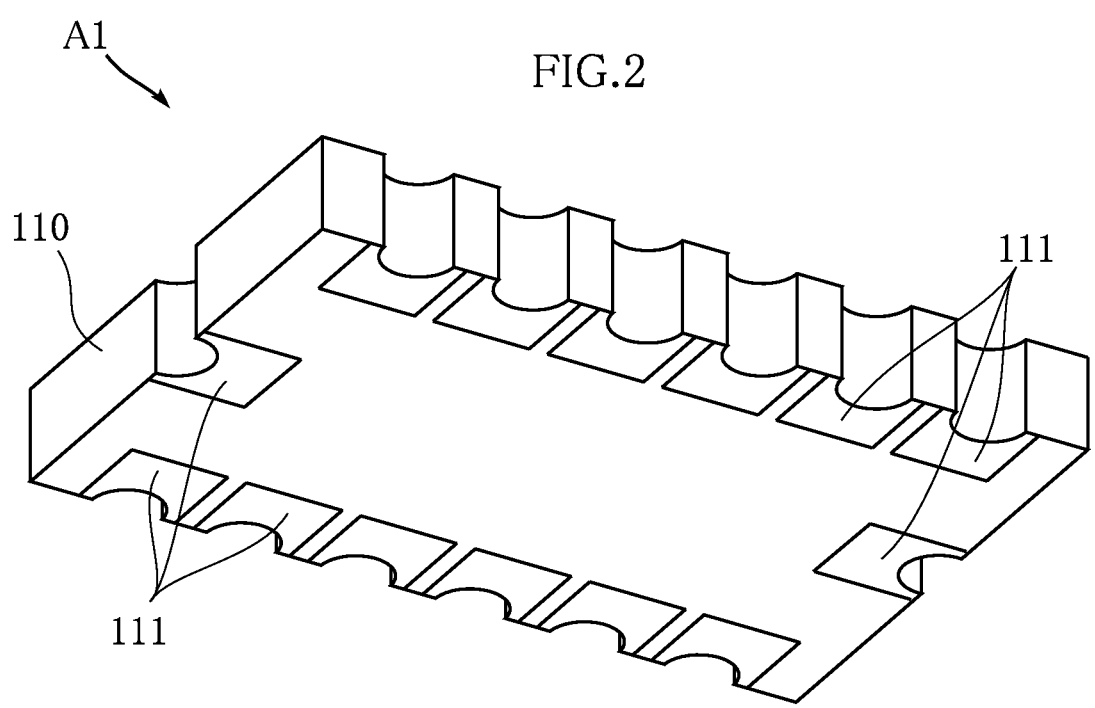
FIG. 2 is a schematic diagram showing the earthquake sensing module based on the first embodiment of the present disclosure.

FIG. 1 is a schematic diagram of an earthquake sensing module A1 viewed from above. FIG. 2 is a schematic diagram of the earthquake sensing module A1 viewed from below. The earthquake sensing module A1 of the present embodiment includes a module substrate 110, an acceleration sensor 120, a module control unit 130, and a module storage unit 140.

The module substrate 110 is the foundation of the earthquake sensing module A1, and for example, is made up of a base member composed of glass epoxy resin and wiring formed on the base member. The shape and size of the module substrate 110 are not particularly limited. In the present embodiment, the module substrate 110 has a rectangular shape in plan view, where the length of an edge is about 6 to 9 mm, and the thickness is about 0.8 to 1.5 mm. The wiring includes a plurality of mounting electrodes 111. The mounting electrodes 111 are formed on one surface of the module substrate 110 and are used to mount the earthquake sensing module A1 on a circuit board, for example. The mounting electrodes 111 may be composed of plating layers of Cu, Ni, or Au, for example.

The acceleration sensor 120 detects accelerations with respect to a plurality of detection axes and outputs signals corresponding to the detected accelerations. The specific configuration of the acceleration sensor 120 is not particularly limited, as long as it is possible to detect accelerations on predetermined detection axes. In the present embodiment, the acceleration sensor 120 is composed of so-called MEMS sensors that are orthogonal to each other. The detection principle of the MEMS sensors constituting the acceleration sensor 120, which can detect accelerations with respect to the x axis, the y axis and the z axis, is not particularly limited, and examples thereof include a detection principle in which acceleration is detected using electrostatic capacitance which may change according to the relative positions of a fixed portion and a movable portion that are configured as cooperating teeth of respective combs.

The module control unit 130 may perform earthquake sensing processing, which will be described hereinafter using the accelerations detected by the acceleration sensor 120. The specific configuration of the module control unit 130 is not particularly limited, and a generally available microprocessor (CPU) may be employed.

The module storage unit 140 stores information of the states of the acceleration sensor. The module storage unit 140 is constituted by a generally available semiconductor memory, and in the present embodiment, a semiconductor chip in which the module control unit 130 and the module storage unit 140 are integrated is employed. Note that the module control unit 130 may also be a component that is separate from the module storage unit 140. In the present embodiment, the state information stored in the module storage unit 140 is information for specifying the orientation of the acceleration sensor 120 with respect to the gravity direction.

Figure 3:
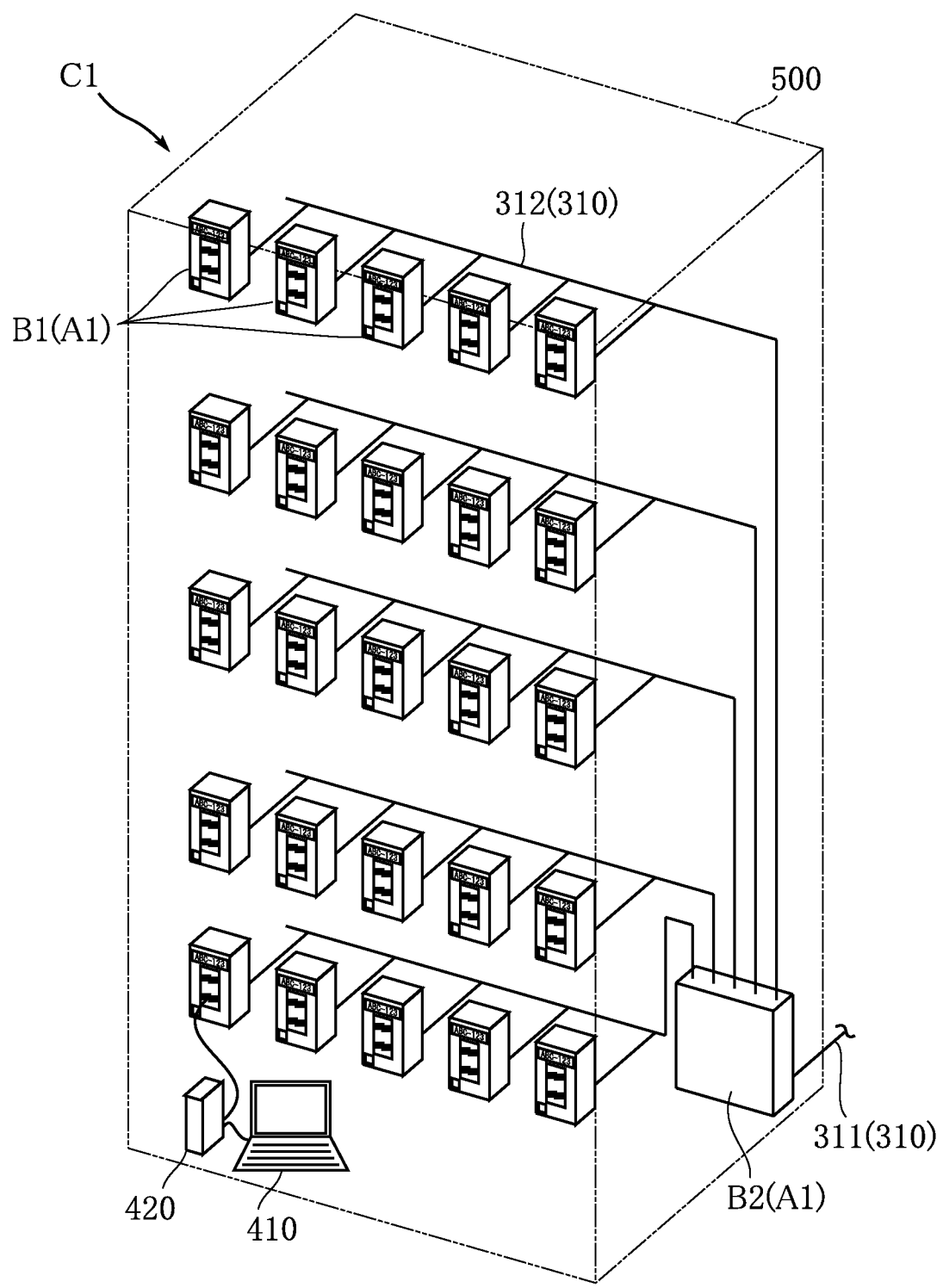
FIG. 3 is a schematic diagram showing an earthquake sensing system based on the first embodiment of the present disclosure.

FIG. 3 is a schematic diagram showing an earthquake sensing system C1 in which the earthquake sensing module A1 is used. The earthquake sensing system C1 includes multiple earthquake sensing apparatuses B1, an earthquake sensing apparatus B2, a communication network 310, a system control unit 410, and a PLC communication apparatus 420, and these components, in the present embodiment, are disposed at suitable locations in a building 500.

Figure 4:
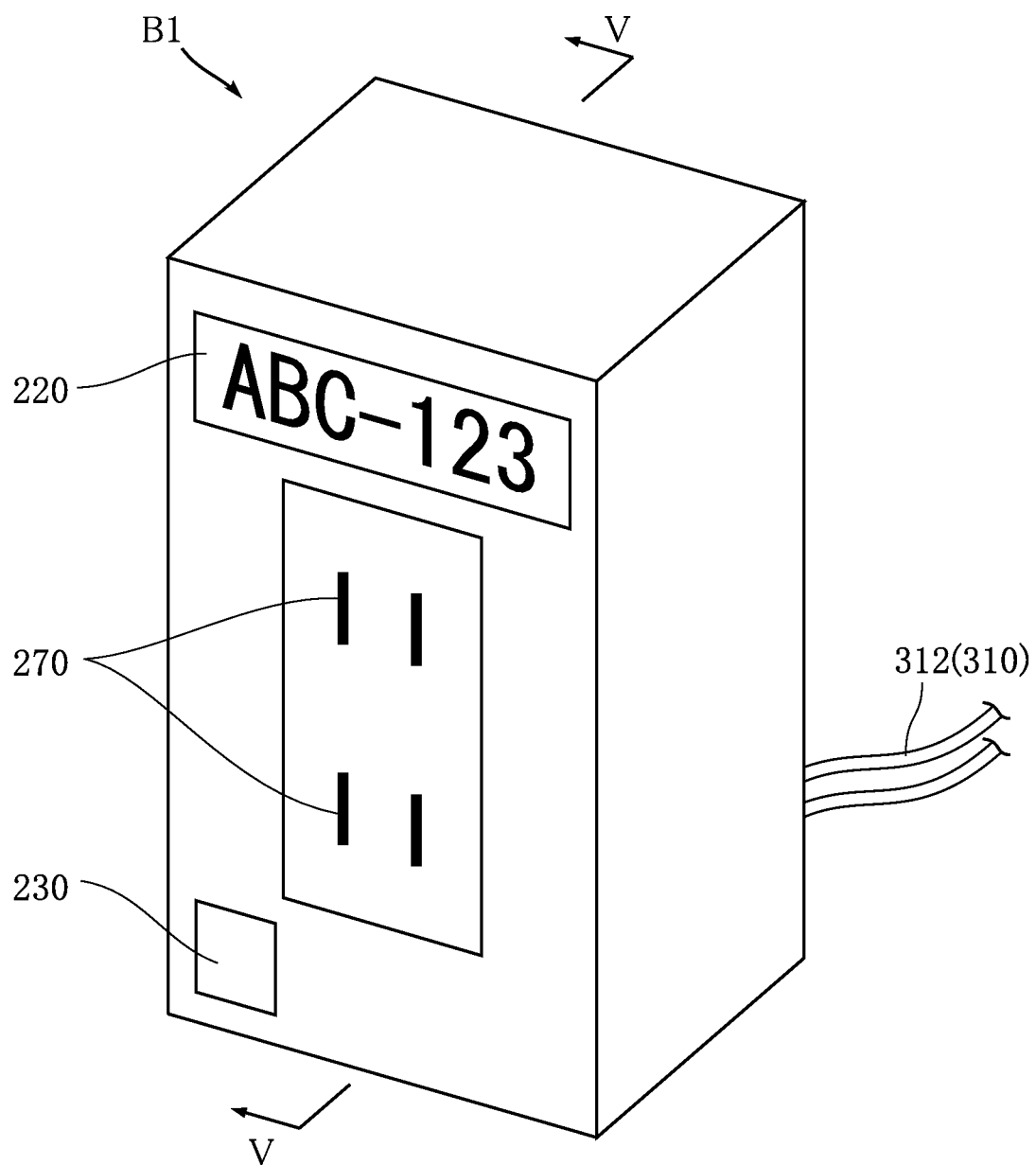
FIG. 4 is a schematic diagram showing an example of an earthquake sensing apparatus of the earthquake sensing system based on the first embodiment of the present disclosure.
Figure 5:
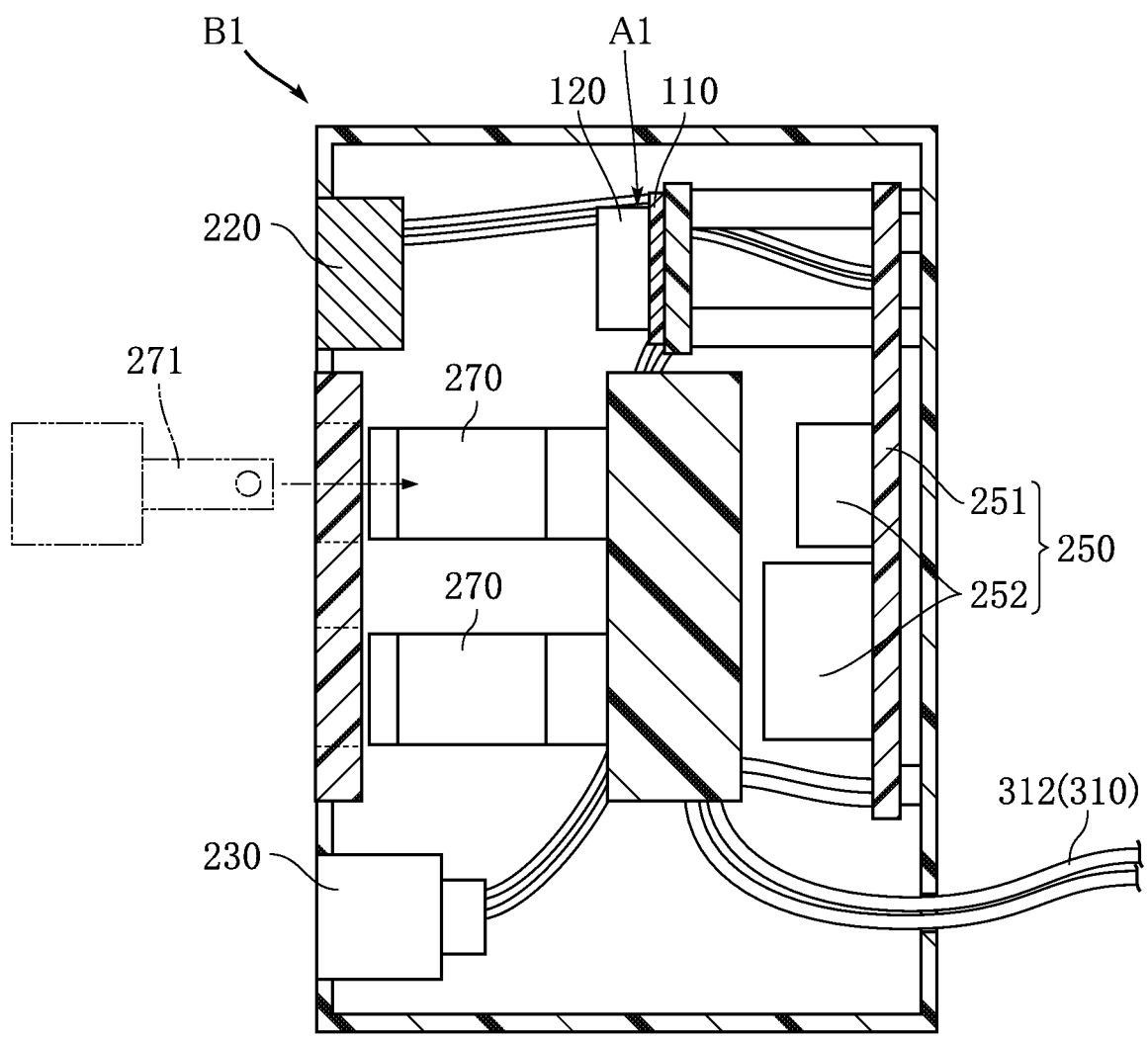
FIG. 5 is a cross-sectional view taken along line V-V shown in FIG. 4.
Figure 6:
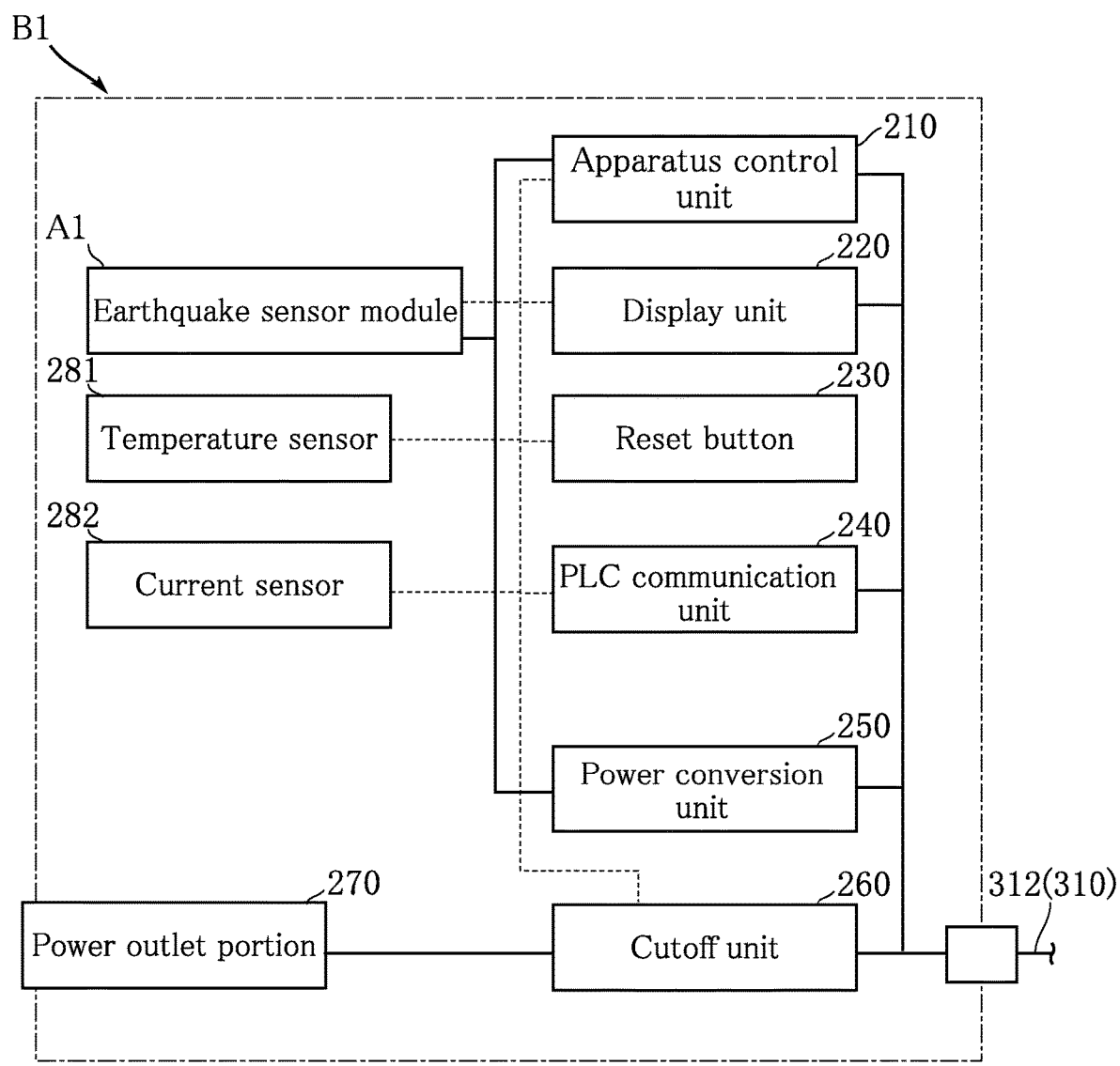
FIG. 6 is a block configuration diagram showing the earthquake sensing apparatus shown in FIG. 4.

FIG. 4 is a schematic diagram showing the earthquake sensing apparatus B1. FIG. 5 is a cross-sectional view taken along line V-V shown in FIG. 4. FIG. 6 is a system configuration diagram showing the earthquake sensing apparatus B1.

The earthquake sensing apparatus B1 is an apparatus configured so that the earthquake sensing module A1 is used suitably in the earthquake sensing system C1. In the present embodiment, the earthquake sensing apparatus B1 includes an earthquake sensing module A1, an apparatus control unit 210, a display unit 220, a reset button 230, a PLC communication unit 240, a power conversion unit 250, a cutoff unit 260, a power outlet portion 270, a temperature sensor 281, and a current sensor 282. The earthquake sensing apparatus B1 is configured to be able to be used as a general electrical power outlet. In the present embodiment, multiple earthquake sensing apparatuses B1 are arranged in a dispersed manner at suitable locations within the building 500, as shown in FIG. 3. The earthquake sensing apparatuses B1 are connected to power lines 312.

The apparatus control unit 210 executes "earthquake sensing processing" and "state information comparison processing" to be described later using earthquake sensing modules A1, and the apparatus control unit 210 controls the constituent elements of the earthquake sensing apparatus B1. The apparatus control unit 210 may be constituted by a micro-processor, for example, and may be equipped with a memory as appropriate.

The display unit 220 is for displaying the state of the earthquake sensing apparatus B1 and various types of information in a visible form, and is constituted by a liquid crystal panel, for example. The reset button 230 is for performing an operation of returning the state of each unit of the earthquake sensing apparatus B1 to an initial state, such as that at the time of factory shipping. When the reset button 230 is pressed, the apparatus control unit 210 initializes the stored content of the memory or transmits an initialization command to the earthquake sensing module A1, for example.

The power outlet portion 270 is a portion into which a plug 271 of a general electrical device is inserted as shown in FIG. 5, so that it comes into electric conduction with the plug 271. The cutoff unit 260 is disposed between the power outlet portion 270 and the power line 312 so that it cuts off the power supply from the power line 312 to the power outlet portion 270. The cutoff performed by the cutoff unit 260 may be performed in response to a cutoff command from the apparatus control unit 210, for example, or may also be performed in response to a cutoff command from the earthquake sensing module A1.

For instance, the power conversion unit 250 may convert AC power supplied from the power line 312 into DC power that is suitable for the operations of the earthquake sensing module A1. In the present embodiment, as shown in FIG. 5, the power conversion unit 250 includes a power substrate 251 and multiple electronic components 252, which are mounted on the power substrate 251. The multiple electronic components 252 are configured to perform the power conversion function of the power conversion unit 250, and may include a transformer, a diode, and a resistor, for example. In the present embodiment, the earthquake sensing module A1 and the power conversion unit 250 are arranged apart along the direction in which the plug 271 is inserted. The earthquake sensing module A1 is disposed at a position closer to the plug 271 than is the power conversion unit 250.

The PLC communication unit 240 is for performing power line communication using the power lines 312 as the communication network 310 by connecting the earthquake sensing apparatus B1 to the power line 312. The communication performed by the PLC communication unit 240 is performed by superposing a signal current of about 2 MHz to 30 MHz, for example, on an AC current to flow in the power line 312.

The temperature sensor 281 is a temperature detection device such as a thermistor, for example, and may detect the temperature of the installation environment of the earthquake sensing apparatus B1. Also, the temperature sensor 281 may detect the operation temperature during operations of the earthquake sensing apparatus B1. The current sensor 282 may detect the current that is supplied from the power outlet portion 270 to the plug 271, for example. The detection signals of the temperature sensor 281 and the current sensor 282 are transmitted to the apparatus control unit 210.

Figure 7:
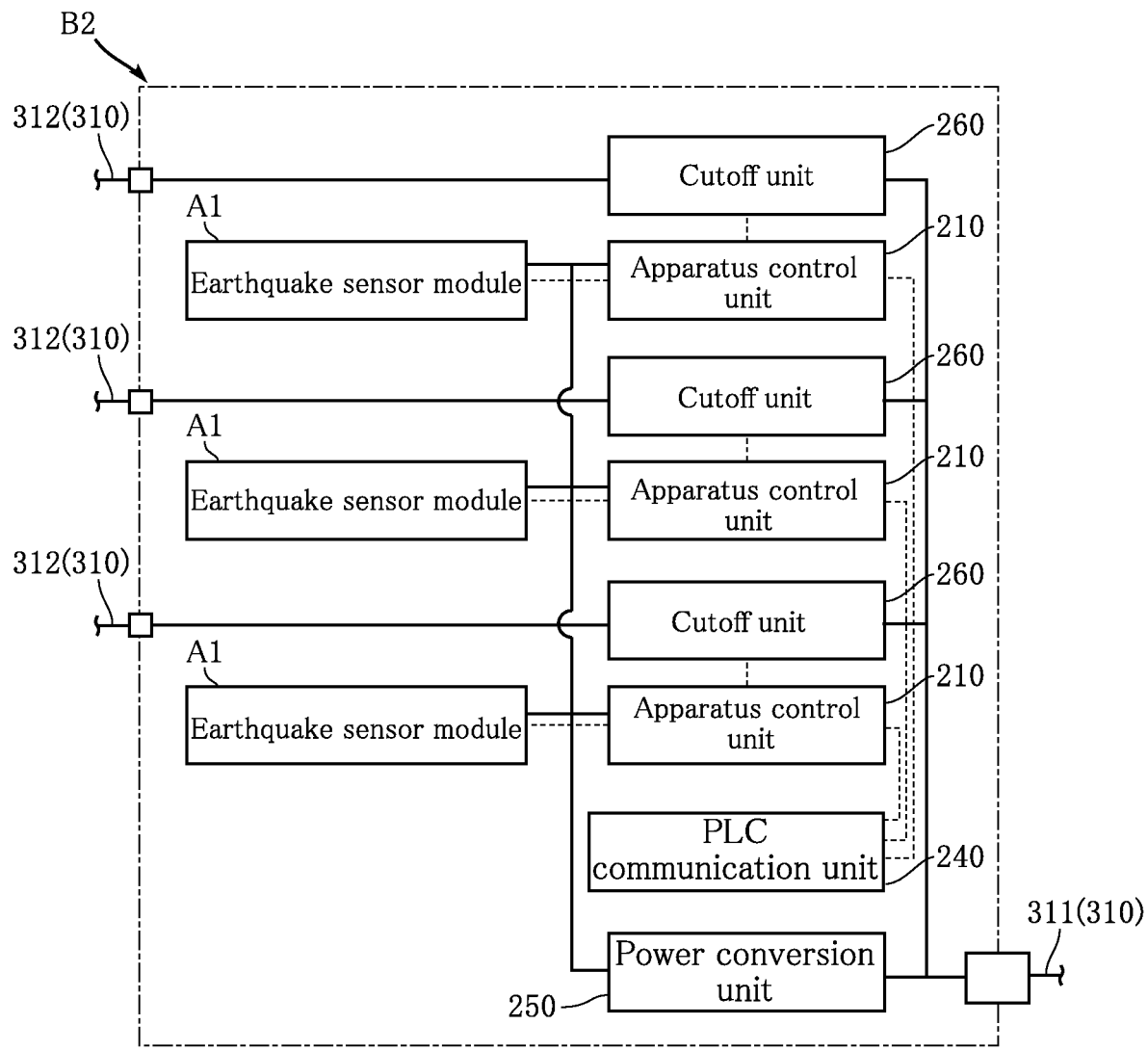
FIG. 7 is a block configuration diagram showing an example of the earthquake sensing apparatus of the earthquake sensing system based on the first embodiment of the present disclosure.

FIG. 7 is a block diagram showing the earthquake sensing apparatus B2. The earthquake sensing apparatus B2 is so configured that the earthquake sensing module A1 is suitably used in the earthquake sensing system C1. In the present embodiment, the earthquake sensing apparatus B2 may include multiple earthquake sensing modules A1, multiple apparatus control units 210, multiple cutoff units 260, a PLC communication unit 240, and a power conversion unit 250. The earthquake sensing apparatus B2 is configured to be able to be used as a breaker, and in the present embodiment, the earthquake sensing apparatus B2 is connected to a power line 311 through which power is supplied from outside of the building 500 and fulfills a function of supplying power from the power line 311 to the multiple power lines 312, as shown in FIGS. 3 and 7.

In the earthquake sensing apparatus B2 of the present embodiment, an earthquake sensing module A1 and an apparatus control unit 210 are provided for each cutoff unit 260. It is also possible to use a configuration in which, unlike the above configuration, one earthquake sensing module A1 is provided for multiple cutoff units 260. It is also possible to use a configuration in which multiple apparatus control units 210 are provided for multiple earthquake sensing modules A1. It is also possible to use a configuration in which the module control unit 130 of the earthquake sensing module A1 executes the functions carried out by the apparatus control unit 210.

As shown in FIG. 3, the system control unit 410 is connected via the PLC communication apparatus 420 to the power lines 312, which serve as a communication network 310. The system control unit 410 performs overall control of operations of the earthquake sensing system C1 and performs setting tasks related to the operations of the earthquake sensing system C1. The PLC communication apparatus 420 is constituted by a personal computer, for example. The PLC communication apparatus 420 connects the system control unit 410 to the power lines 312 serving as the communication network 310 and performs power line communication.

Next, operations of the earthquake sensing module A1, the earthquake sensing apparatus B1, and the earthquake sensing system C1 will be described below.

Figure 8:
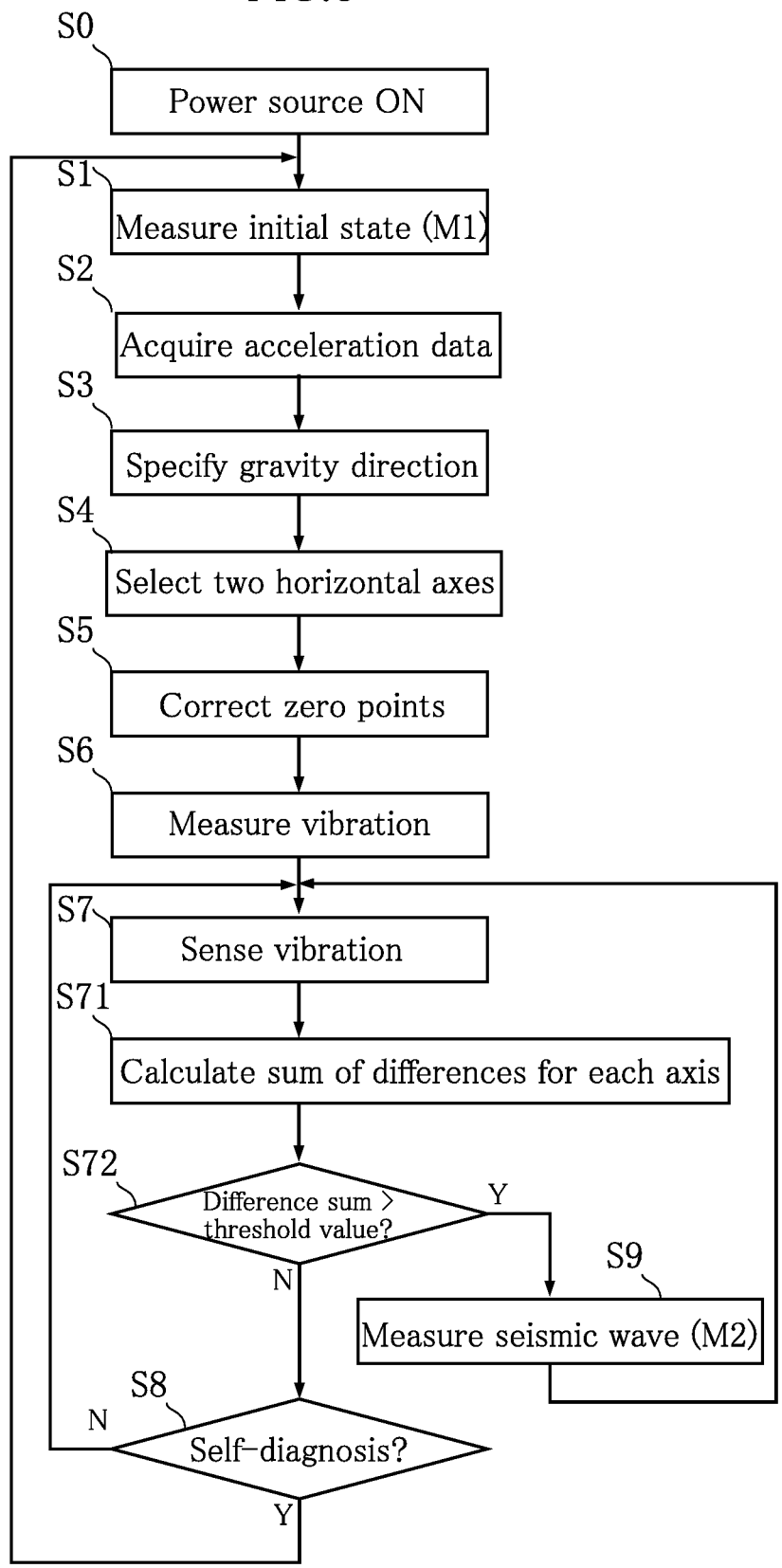
FIG. 8 is a flowchart showing an example of operations of the earthquake sensing module based on the first embodiment of the present disclosure.

FIG. 8 shows an example of operations of the earthquake sensing module A1. In step S0, the power source of the earthquake sensing module A1 is turned on. The acceleration sensor 120 may perform the following processing in accordance with programs stored in advance in the module control unit 130, for example.

In step S1, an initial state storage mode M1 is started. The initial state storage mode M1 is performed in a steady state in which vibration such as an earthquake is not present. In step S2, acceleration data is acquired for the x axis, the y axis, and the z axis of the acceleration sensor 120. Then, in step S3, the gravity direction Ng is determined. In the steady state in which vibration such as an earthquake is not occurring, it is thought that the acceleration applied to the acceleration sensor 120 is only the gravitational acceleration. The accelerations along the x axis, the y axis, and the z axis are added as vectors to work out the gravity direction Ng. The module control unit 130 stores the gravity direction Ng in the module storage unit 140 as the initial gravity direction Ngi. Next, in step S4, two axes that are orthogonal to the initial gravity direction Ngi are selected. These axes are orthogonal to each other and are defined as horizontal axes. The module control unit 130 stores these horizontal axes in the module storage unit 140. Next, in step S5, "zero-point correction" is performed. In a steady state, in which vibration such as an earthquake is not present and only the gravitational acceleration exists, the accelerations with respect to the x, y and z axes are detected, and the module control unit 130 causes these detected accelerations to be stored in the module storage unit 140 as the "zero points of acceleration" with respect to the x, y and z axes.

Next, in step S6, measurement of vibration is performed. In this vibration measurement, in step S7, vibration sensing processing is performed. The vibration sensing processing is for sensing whether or not significant vibration is occurring, and for example, the process is executed along the following procedure. First, in step S71, using the sensor 120, the accelerations on the x, y and z axes or the accelerations for the gravity direction Ng and the two horizontal axes are acquired, and then the difference between each acceleration and the initial acceleration stored as the initial state information in step S5 is calculated for each axis. Then, the difference values of the accelerations on all of the respective axes are added up to calculate the sum. Next, in step S72, the sum of the accelerations obtained in step S71 and an acceleration threshold value stored in advance in the module storage unit 140 are compared. Alternatively, it is also possible that only one acceleration on a selected one of the axes may be compared with a corresponding acceleration threshold value, or only the accelerations on the two horizontal axes may be compared with their corresponding acceleration threshold values, or the total value of the accelerations on multiple axes selected as appropriate may be compared with a corresponding acceleration threshold value. In the present embodiment, if the sum of the accelerations is greater than the acceleration threshold value, it is determined that vibration has been sensed (step S72: YES), and step S9 is executed. On the other hand, if the sum of the accelerations is less than or equal to the acceleration threshold value (step S72: No), it is determined that no significant vibration is being applied, and the module control unit 130 determines whether or not self-diagnosis is needed in step S8. If self-diagnosis may be needed, for example, due to an instruction from a host control means, the self-diagnosis of the acceleration sensor 120 is performed based on a change in state of the acceleration sensor 120 in response to a change in a predetermined condition. In the present embodiment, for example, diagnosis is performed based on whether or not the comb teeth-like movable portions are operating normally upon application of a predetermined voltage to the acceleration sensor 120. After the self-diagnosis is performed, the processing returns to step S1. On the other hand, if it is determined that significant vibration is being applied (step S72: Yes), the module control unit 130 executes a vibration measurement mode M2 in step S9. Note that from the viewpoint of reducing power consumption, for example, in the processing until when the vibration measurement mode M2 is executed, the sampling rate for the accelerations of the acceleration sensor 120 is preferably a comparably low frequency, and is set to about 100 Hz, for example. Also, if it is determined that significant vibration is being applied (step S72: Yes), the module control unit 130 may also output a detection signal for performing notification of the fact that significant vibration has been detected. This detection signal may be maintained until the power source of the earthquake sensing module A1 turns off, and may also be maintained for a pre-set amount of time. The earthquake sensing module A1 may also be configured to cause the module storage unit 140 to store the number of instances of returning to step S9 after the power source is turned on in Step S9.

As a modified example of step S7, determination processing different from that of step S71 and step S72 described above may also be performed. For example, the magnitude (acceleration, amplitude, etc.) of vibration on each axis may be separately calculated in step S71, and in Step S72, each of the magnitudes for the respective axes may be compared with a corresponding pre-set threshold value for the single axis. Alternatively, in step S71, an added value of the magnitudes of the vibrations on the three axes may be calculated, and in step S72, the added value may be compared with a pre-set threshold value for the three axes. Alternatively, in step S71, an added value of the magnitudes of the two horizontal axes may be calculated, and in step S72, the added value may be compared with a pre-set threshold value for the two horizontal axes only.

Figure 9:
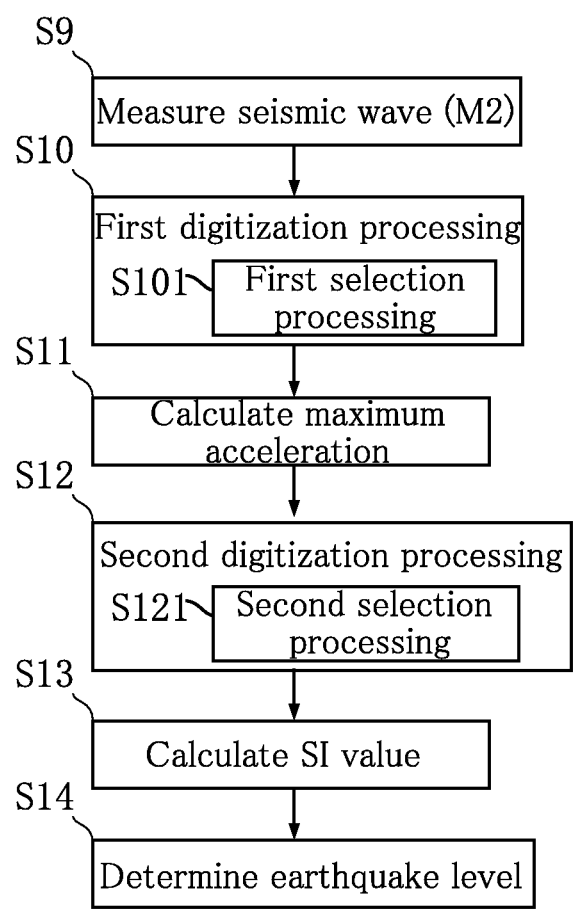
FIG. 9 is a flowchart showing an example of operations of the earthquake sensing module based on the first embodiment of the present disclosure.

FIG. 9 shows an example of operations of the vibration measurement mode M2. In step S9, when the vibration measurement mode M2 is started, the module control unit 130 executes first digitization processing S10. The first digitization processing S10 is processing for obtaining digitized acceleration data by sampling the accelerations outputted from the acceleration sensor 120 at a first sampling rate R1. The frequency of the first sampling rate R1 is not particularly limited, and it is preferable to use a frequency according to which the vibration applied to the module control unit 130 can be expressed with a sufficient resolution. In the present embodiment, the first sampling rate R1 is, for example, about 1600 Hz. Note that in the vibration measurement mode M2, acceleration data such as the total value of the acceleration data of the gravity direction Ng and the two horizontal axes, a single acceleration of one axis, the accelerations on only the two horizontal axes, or the total value of accelerations on multiple axes selected as appropriate may be selected as the processing target as needed.

Also, in the present embodiment, the first digitization processing S10 includes first selection processing S101. The first selection processing S101 is performed with respect to the vibration data constituted by the acceleration data sampled at the first sampling rate R1, so that data of vibration with a first frequency F1 or less is selected to be maintained, and data of vibration exceeding the first frequency F1 is to be removed. The first frequency F1 is a frequency that is significantly lower than the first sampling rate R1, and in the present embodiment is set to about 20 Hz. This is due to the fact that the frequency of a common earthquake is about 0.4 Hz to 10 Hz, and a range that sufficiently includes the frequency of a common earthquake is selected.

Next, the module setting unit 130 executes step S11. In step S11, the module control unit 130 calculates the maximum acceleration of the vibration based on the acceleration data (vibration data) obtained through the first digitization processing S10. The maximum acceleration contributes to approximate grasping of the scale of the vibration, and may be stored in the module storage unit 140, for example.

Next, the module control unit 130 executes second digitization processing S12. The second digitization processing S12 is processing for sampling the acceleration data (vibration data) obtained through the first digitization processing S10 at a second sampling rate R2. The frequency of the second sampling rate R2 is not particularly limited as long as it is lower than the first sampling rate R1, and is preferably a frequency that is suitable for the subsequent processing. In the present embodiment, the second sampling rate R2 is, for example, about 100 Hz, and is about 6.3% of the first sampling rate R1. Note that the value of the second sampling rate R2 is set so as to be compatible with the calculation condition of the SI value, which will be described later.

Also, in the present embodiment, the second digitization processing S12 includes second selection processing S121. The second selection processing S121 is performed with respect to the vibration data constituted by the acceleration data sampled at the second sampling rate R2, so that data of vibration with a second frequency F2 or less is selected to be maintained, and date of vibration exceeding the second frequency F2 is to be removed. The second frequency F2 is a frequency that is significantly lower than the second sampling rate R2, and in the present embodiment, is set to about 10 Hz. This is due to the fact that the frequency of a common earthquake is about 0.4 Hz to 10 Hz.

Next, the module setting unit 130 executes step S13. In step S13, the module control unit 130 calculates an SI value V using the acceleration data (vibration data) obtained through the second digitization processing S12. The SI value V is a numerical index that indicates the level of damage that may occur in a common building due to an earthquake. Specifically, the SI value V is obtained by averaging the maximum velocity response values of a number of pendulums when these pendulums, each having a natural or characteristic period in a range of 0.1 seconds to 2.5 seconds and an attenuation constant of 20%, are excited by the earthquake. Note that in step S13, similarly to the vibration measurement mode M2, the SI value V can be calculated based on acceleration data selected as appropriate from acceleration data such as the total value of the acceleration data for the gravity direction Ng and the two horizontal axes, a single acceleration on one axis, the accelerations on only the two horizontal axes, or the total value of the accelerations on multiple axes selected as appropriate.

Next, in step S14, earthquake level determination is performed. In step S14, the magnitude (level) of the earthquake is determined based on the SI value V obtained in step S13. In this determination, the maximum acceleration obtained in step S11 may also be used additionally.

If, as a result of step S14, it is determined that an earthquake of an alarming level has occurred, the module control unit 130 outputs the numerical value information of the SI value V or the determination result signal to the apparatus control unit 210. For example, in the earthquake sensing apparatus B1 shown in FIGS. 3 and 6, the apparatus control unit 210 cuts off the power supply from the power line 312 to the power outlet portion 270 using the cutoff unit 260, when the earthquake motion is of an alarming level. Also, in the earthquake sensing apparatus B2 shown in FIGS. 3 and 7, each apparatus control unit 210 cuts off the power supply from the power line 311 to the power line 312 using their corresponding cutoff unit 260. Note that the measurement and determination processing in steps S9 to S14 may be performed on a single acceleration on one axis, the accelerations on the two horizontal axes, or a total values of the accelerations on multiple axes selected as appropriate.

Figure 10:
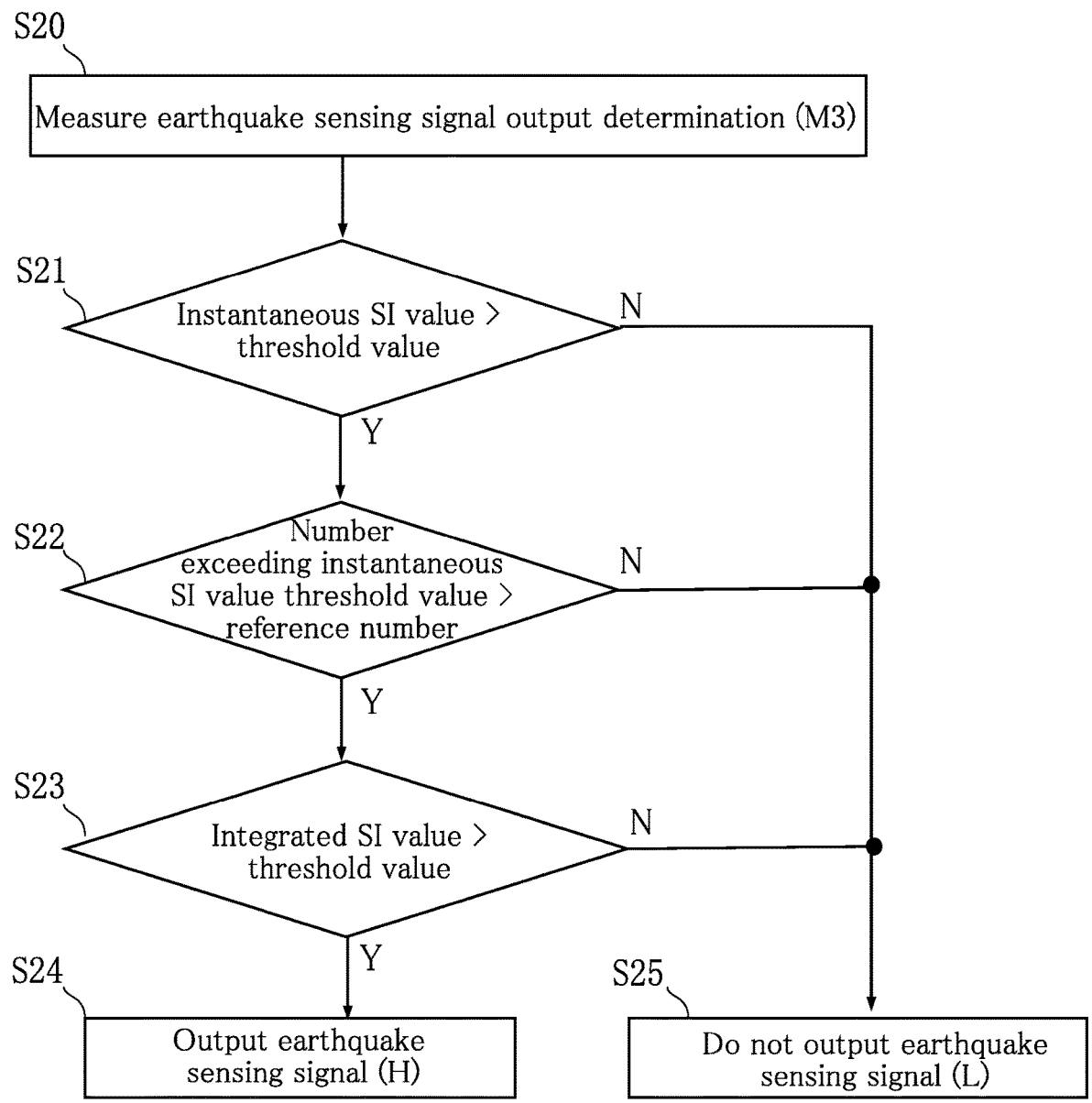
FIG. 10 is a flowchart showing an example of operations of the earthquake sensing module based on the first embodiment of the present disclosure.

Also, the earthquake sensing module A1 of the present embodiment may also execute an earthquake sensing signal output determination mode M3 shown in FIG. 10 as additional processing. When the earthquake sensing signal output determination mode M3 is started in step S20, the module control unit 130 executes the first determination processing S21. In the first determination processing S21, the SI value V and a pre-set SI value threshold value Vt are compared. If the SI value V does not exceed the SI value threshold value Vt, it is determined that the vibration is not earthquake motion (first determination processing S21: No, step S25). On the other hand, if the SI value V exceeds the SI value threshold value Vt, it is determined that there is a possibility that the vibration is earthquake motion (first determination processing S21: Yes), and the processing moves to the second determination processing S22. The size of the SI value threshold value is set as appropriate, and in the present embodiment, it is about 18 cm/sec, for example. Note that "Kine" may be used synonymously with cm/sec as the unit of the SI value.

In the second determination processing S22, the instance count N of instances that the SI value V has exceeded the SI value threshold value Vt within a predetermined amount of time is counted. Then, the instance count N and a pre-set instance count threshold value Nt are compared. If the instance count N does not exceed the instance count threshold value Nt, it is determined that the vibration is not earthquake motion (second determination processing S22: No, step S25). On the other hand, if the instance count N exceeds the instance count threshold value Nt, it is determined that there is a possibility that the vibration is earthquake motion (second determination processing S22: Yes), and the processing moves to the third determination processing S23. The instance count threshold value Nt is set as appropriate, and in the present embodiment, it is 4, for example.

In the third determination processing S23, an integration of the SI value V over a predetermined period of time is calculated to provide an "integrated IS value VI", and this integrated IS value VI and a pre-set integrated SI value threshold value VIt are compared. If the integrated SI value VI does not exceed the integrated SI value threshold value VIt, it is determined that the vibration is not earthquake motion (third determination processing S23: No, step S25). On the other hand, if the integrated SI value VI exceeds the integrated SI value threshold value VIt, it is determined that the vibration is earthquake motion (third determination processing S23: Yes), and in step S24, the module control unit 130 outputs the earthquake sensing signal, which may be set to a Hi state. In a case where the integration of the integrated SI value VI is performed based on acceleration data sampled by the above-described second sampling rate R2, the integrated SI value VI is calculated by integrating five consecutive SI values V. In this case, the integrated SI value threshold value VIt may be about 108 cm, for example.

If the earthquake sensing signal is in the Hi state in step S24, the position control unit 210 executes the cutoff processing performed by the above-described cutoff unit 260. On the other hand, if the determination result is "No" in any one of the first determination processing S21, the second determination processing S22, and the third determination processing S23, the module control unit 130 keeps the earthquake sensing signal in the Lo state in step S25. In this case, the above-described cutoff processing is not executed by the cutoff unit 260. Note that the output of the earthquake sensing signal in step S24 and step S25 is not limited to being switched between the Hi state and the Lo state of a single signal, and it may be arranged that any proper signal indicating whether or not an earthquake has been sensed is outputted from the module control unit 130. It may also be arranged that the processing is controlled to return to step S7 in FIG. 8 after a predetermined amount of time has elapsed from the end of step S25.

FIGS. 11 to 14 show examples of determination performed in the earthquake sensing signal output determination mode M3. FIGS. 11 to 14 illustrate collision vibration that is not earthquake motion. FIG. 11 shows an example in which the count of collision is 1, FIG. 12 shows an example in which the count of collision is 2, FIG. 13 shows an example in which the count of collision is 3, and FIG. 14 shows an example in which the count of collision is 4.

FIGS. 11(a) and 11(b) are graphs of the accelerations on the two horizontal axes in the case where the collision instance count is 1. As illustrated, an acceleration peak corresponding to one instance of collision is shown. FIG. 11(c) shows the SI value V and the integrated SI value VI in the case where the collision instance count is 1. As shown in FIG. 11(c), in the present example, there is an SI value V that exceeds the SI value threshold value Vt, and the determination result of the first determination processing S21 is "Yes". However, the instance count N is 2, which does not exceed the instance count threshold value Nt (=4). Hence, the determination result of the second determination processing S22 is "No", and it is determined in step S25 that the sensing is erroneous, meaning that the vibration is not earthquake motion.

FIGS. 12(a) and 12(b) are graphs of the accelerations on the two horizontal axes in the case where the collision instance count is 2. As illustrated, acceleration peaks corresponding to two instances of collision are shown. FIG. 12(c) shows the SI value V and the integrated SI value VI in the case where the collision instance count is 2. As shown in FIG. 12(c), in the present example, there is an SI value V that exceeds the SI value threshold value Vt, and the determination result of the first determination processing S21 is "Yes". However, the instance count N is 3, which does not exceed the instance count threshold value Nt (=4). Hence, the determination result of the second determination processing S22 is "No", and it is determined in step S25 that the sensing is erroneous, meaning that the vibration is not earthquake motion.

FIGS. 13(a) and 13(b) are graphs of the accelerations on the two horizontal axes in the case where the collision instance count is 3. As illustrated, acceleration peaks corresponding to three instances of collision are shown. FIG. 13(c) shows the SI value V and the integrated SI value VI in the case where the collision instance count is 3. As shown in FIG. 13(c), in the present example, there is an SI value V that exceeds the SI value threshold value Vt, and the determination result of the first determination processing S21 is "Yes". However, the instance count N is 3, which does not exceed the instance count threshold value Nt (=4). Hence, the determination result of the second determination processing S22 is "No", and it is determined in step S25 that the sensing is erroneous, meaning that the vibration is not earthquake motion. In this example, however, the integrated SI value VI exceeds the integrated SI value threshold value VIt. Hence, if the third determination processing S23 is executed, the determination result will be "Yes" for this processing.

FIGS. 14(a) and 14(b) are graphs of the accelerations on the two horizontal axes in the case where the collision instance count is 4. As illustrated, acceleration peaks corresponding to four instances of collision are shown. FIG. 14(c) shows the SI value V and the integrated SI value VI in the case where the collision instance count is 4. As shown in FIG. 14(c), in the present example, there is an SI value V that exceeds the SI value threshold value Vt, and the determination result of the first determination processing S21 is "Yes". Also, the instance count N is 5, which exceeds the instance count threshold value Nt (=4). Hence, the determination result of the second determination processing S22 is "Yes". However, since the integrated SI value VI does not exceed the integrated SI value threshold value VIt, the determination result of the third determination processing S23 is "No", and it is determined in step S25 that the sensing is erroneous, meaning that the vibration is not earthquake motion.

Figure 15:
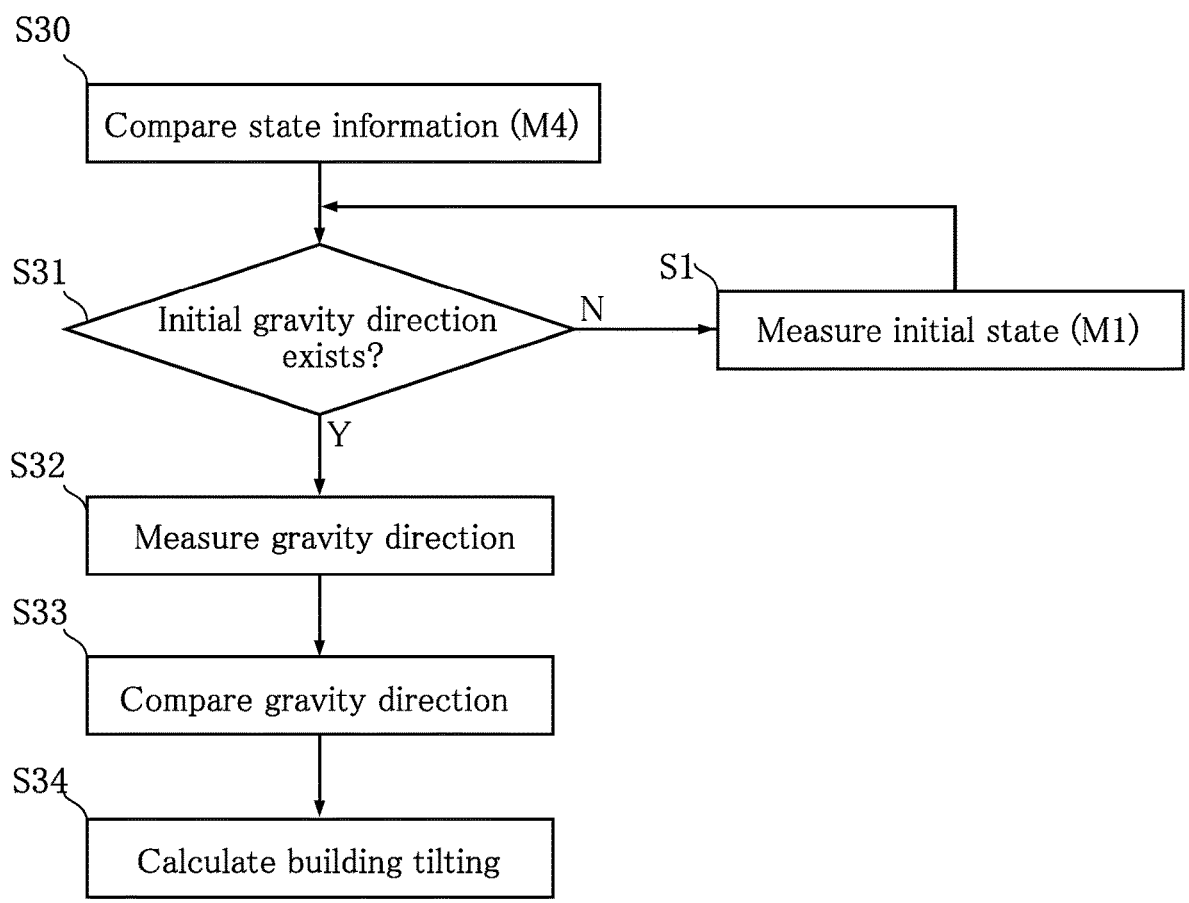
FIG. 15 is a flowchart showing an example of operations of the earthquake sensing system based on the first embodiment of the present disclosure.

FIG. 15 shows an example of operations of a state information comparison mode M4 of the earthquake sensing system C1. For example, when the system control unit 410 starts the state information comparison mode M4 in step S30, the system control unit 410 determines in step S31 whether or not the multiple earthquake sensing modules A1 provided in the earthquake sensing system C1 have already specified the initial gravity direction Ngi through execution of the initial state storage mode M1. If the initial gravity direction Ngi has not been specified (step S31: No), the system control unit 410 causes the earthquake sensing module A1 to execute the initial state storage mode M1.

If the initial gravity directions Ngi of all of the earthquake sensing modules A1 have been specified (step S31: Yes), the system control unit 410 executes step S32. In step S32, the system control unit 410 causes each earthquake sensing module A1 to acquire the acceleration data for the x axes, the y axes, and the z axes of the acceleration sensors 120 at that time. Then, the gravity direction Ng at that time is determined.

Figure 16:
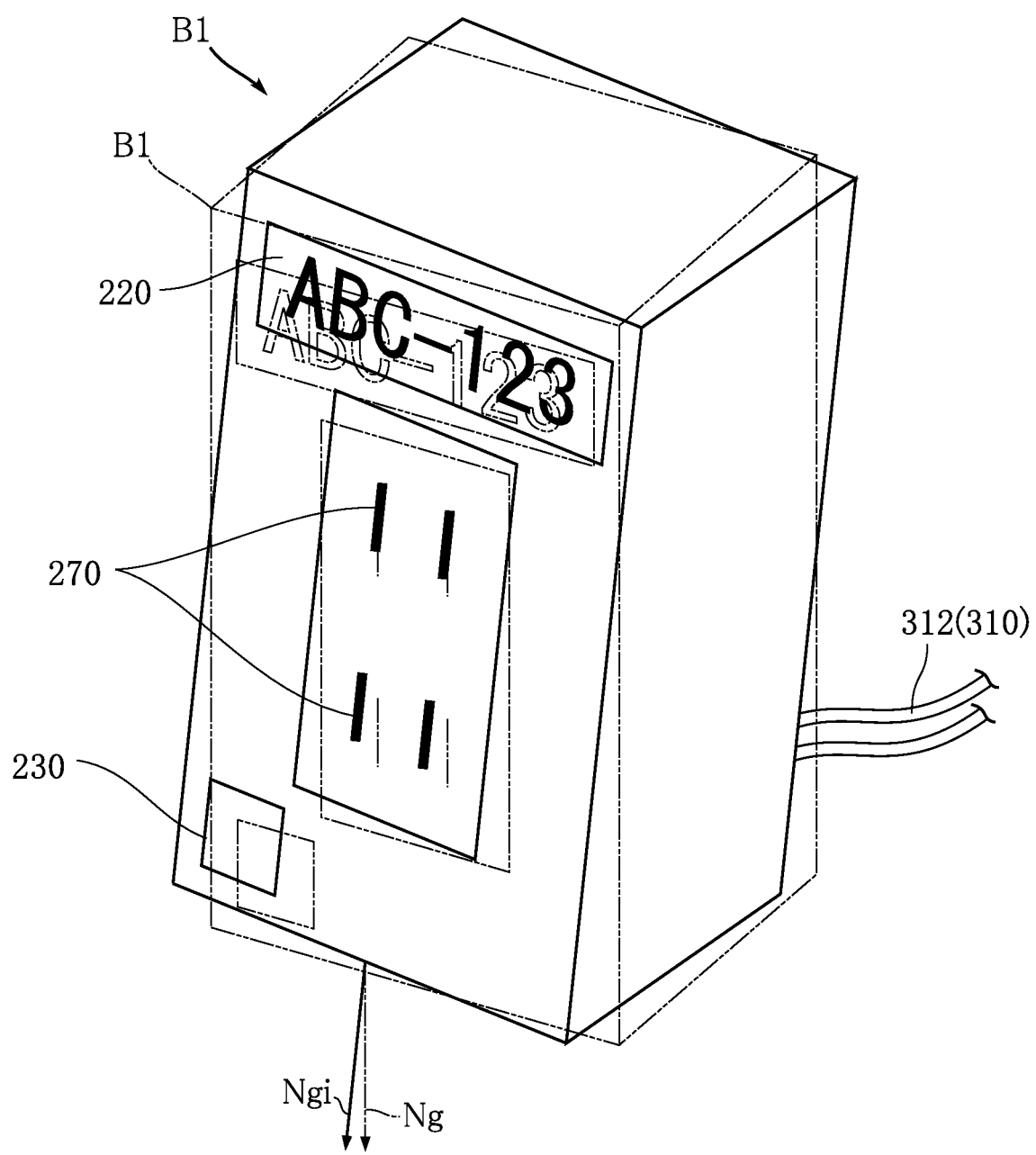
FIG. 16 is a schematic diagram showing an example of operations of the earthquake sensing system based on the first embodiment of the present disclosure.

Next, in step S33, the pre-stored initial gravity direction Ngi and the gravity direction Ng specified in step S32 are compared. The earthquake sensing apparatus B1, indicated by imaginary lines (two-point chain lines) in FIG. 16, is in the initial state at the time when the initial gravity direction Ngi has been specified. The state in which the orientation of the earthquake sensing apparatus B1 with respect to the gravity direction Ng has changed due to the occurrence of an earthquake or change over the years in the building 500 is indicated by a solid line. If the earthquake sensing apparatus B1 is inclined with respect to the gravity direction Ng, the initial gravity direction Ngi specified by the earthquake sensing module A1 of the earthquake sensing apparatus B1 is a vector indicating a direction different from the gravity direction Ng at that time. In step S33, the difference between the gravity direction Ng and the initial gravity direction Ngi is calculated as an amount of angle, for example, and is stored in a memory in the system control unit 410. When step S33 is executed for all of the earthquake sensing apparatuses B1 (earthquake sensing modules A1), the system control unit 410 executes step S34.

In step S34, the system control unit 410 determines to what extent the respective portions of the building 500 shown in FIG. 3 are inclined with respect to the gravity direction Ng, using the above-noted angles corresponding to the differences between the gravity direction Ng and the initial gravity direction Ngi calculated for the respective earthquake sensing apparatus B1. By the above determination, the amounts of strain at the portions of the building 500 can be calculated, and it is possible to grasp the overall tilting of the building 500 with respect to e.g., the ground surface, or partial deformation inside of the building 500, for example.

Next, the workings of the earthquake sensing module A1 and the earthquake sensing system C1 will be described.

According to the present embodiment, the earthquake sensing module A1 includes the module control unit 130 and the module storage unit 140. The module control unit 130 performs processing based on the acceleration data from the acceleration sensor 120, and the results of the processing can be stored in the module storage unit 140, which is advantageous to achieving higher functionality of the earthquake sensing module A1.

The earthquake sensing module A1 can store, in the module storage unit 140, the state information of the acceleration sensor 120 in an initial state, e.g., the state at the beginning of device installation, as the initial state information by executing the initial state storage mode M1 shown in FIG. 8. By storing the initial gravity direction Ngi as the initial state information, it is possible to realize higher functionality of the earthquake sensing system C1 described with reference to FIGS. 15 and 16. By performing the vibration sensing processing of steps S7 to S72, the earthquake sensing module A1 can quantitatively and rapidly sense a state in which it is highly likely that the acceleration has changed due to earthquake motion. Also, by performing the self-diagnosis processing of step S8, the earthquake sensing module A1 can recognize that the acceleration sensor 120 is in an unintended non-operating state due to long-term use. For example, it is possible to use a configuration in which if, as a result of executing step S8, it has been diagnosed that the acceleration sensor 120 is not functioning normally, the module control unit 130 outputs a sensor error signal to the outside.

As shown in FIG. 9, in the vibration measurement mode M2, two stages of processing, namely the first digitization processing S10 and the second digitization processing S12 are performed. By performing the first digitization processing S10 in which a first frequency F1, which is a comparatively high frequency, is used, it is possible to sample vibration that actually occurs with a sufficient resolution. By performing sampling with a sufficient resolution, in the first selection processing S101 for example, vibration components different from the earthquake motion can be reliably excluded. Performing the second digitization processing after the first digitization processing S10 has ended can prevent high-frequency vibration serving as noise that is different from the earthquake motion from accidentally matching with the second frequency F2 of the second digitization processing S12 and being recognized as vibration at a frequency near the earthquake motion in the case where the second digitization processing S12 is executed without executing the first digitization processing, for example. Also, by performing sampling using the second frequency F2, which is a lower frequency, in the second digitization processing S12, it is possible to suitably reduce the amount of data used to calculate the SI value V in step S13.

By executing the earthquake sensing signal output determination mode M3 shown in FIG. 10, even if it is determined, as a result of the execution of the first digitization processing S10 and the second digitization processing S12, that the collision vibration is earthquake motion, this kind of erroneous sensing can be properly eliminated. In the determination of the erroneous sensing, the comparison of the SI value V and the SI value threshold value Vt in the first determination processing S21 can be performed on instantaneous scales of vibrations so as to determine whether or not the vibration is earthquake motion, which is advantageously effective. Also, the comparison of the instant count N and the instant count threshold value Nt in the second determination processing S22 determines whether or not the vibration is earthquake motion based on the temporal continuousness of the vibration, which is preferable for increasing the accuracy of determination. Also, in the comparison of the integrated SI value VI and the integrated SI value threshold value VIt in the third determination processing S23, the energy of the vibration being temporally continuous is used as a determination condition. This kind of determination is based on the earthquake motion having a continuous energy distribution, whereas the multiple instances of collision vibration have discrete energy distributions, and thus this kind of determination is suitable for improving the accuracy of determination. Also, by executing all of the first determination processing S21, the second determination processing S22, and the third determination processing S23, it is possible to significantly reduce erroneous sensing.

In steps S13 and S14 and steps S20 to S25 shown in FIGS. 9 to 14, PGA (peak ground acceleration) values may be used. That is, the threshold values, instance counts serving as determination references, and the like may be set for the PGA values similarly to the threshold values, instance counts serving as determination references, and the like set in steps S13 and S14 and steps S20 to S25 for the SI values, and determination processing similar to those in the case of using the SI values may be performed. Note that regarding the employment of PGA values, PGA values may be used instead of SI values, and SI values and PGA values may be used together.

As shown in FIGS. 4 and 5, the earthquake sensing module A1 is small compared to the pendulum-type earthquake sensor module, for example, and thus it is possible to arrange the earthquake sensing module A1 and the power conversion unit 250 in alignment in the insertion direction of the plug 271. The earthquake sensing apparatus B1 is used as a power outlet, and its installation space is limited. According to the present embodiment, the earthquake sensing apparatus B1 can be set to a size that is approximately the same as that of a normal power outlet. Also, the power conversion unit 250 that fulfills the power conversion function includes a bulky electronic component 252 such as a transformer. Even if the power conversion unit 250 itself becomes bulky, the power conversion unit 250 can be suitably contained as long as the dimension of the earthquake sensing apparatus B1 is expanded in the insertion direction of the plug 271. In this case, the size of the earthquake sensing apparatus B1 in a view in the insertion direction of the plug 271 can be made approximately stable.

Through the state information comparison mode M4 shown in FIGS. 15 and 16, it is possible to realize diagnosis of e.g., deformation of the building 500, which is completely different from earthquake sensing, using the earthquake sensing module A1 whose main function is earthquake sensing. In particular, the earthquake sensing apparatus B1, which is constituted as a power outlet, can be used as a power outlet in each room of the building 500, which may serve as a large-scale multiple-dwelling house, for example. In this case, a very large number of earthquake sensing apparatuses B1 are arranged throughout the building 500. Accordingly, they are suited to diagnosing e.g., deformation of the building 500.

Due to the earthquake sensing apparatus B1 and the earthquake sensing apparatus B2 including the PLC communication units 240, there is no need to prepare a dedicated communication network. The power line 311 and the power line 312 serving as the communication network 310 can be suitably contained in the building 500, and it is possible to prevent unintended dead space from occurring in the building 500 for communication. Also, the power line 312 can be used as a power supply path to the earthquake sensing apparatus B1 and the earthquake sensing apparatus B2. Furthermore, it is possible to cause the cutoff unit 260 to operate for each earthquake sensing apparatus B1 or for each earthquake sensing module A1 of the earthquake sensing apparatus B2, and if earthquake motion occurs, more meticulous power cutoff control can be performed.

Figure 17:
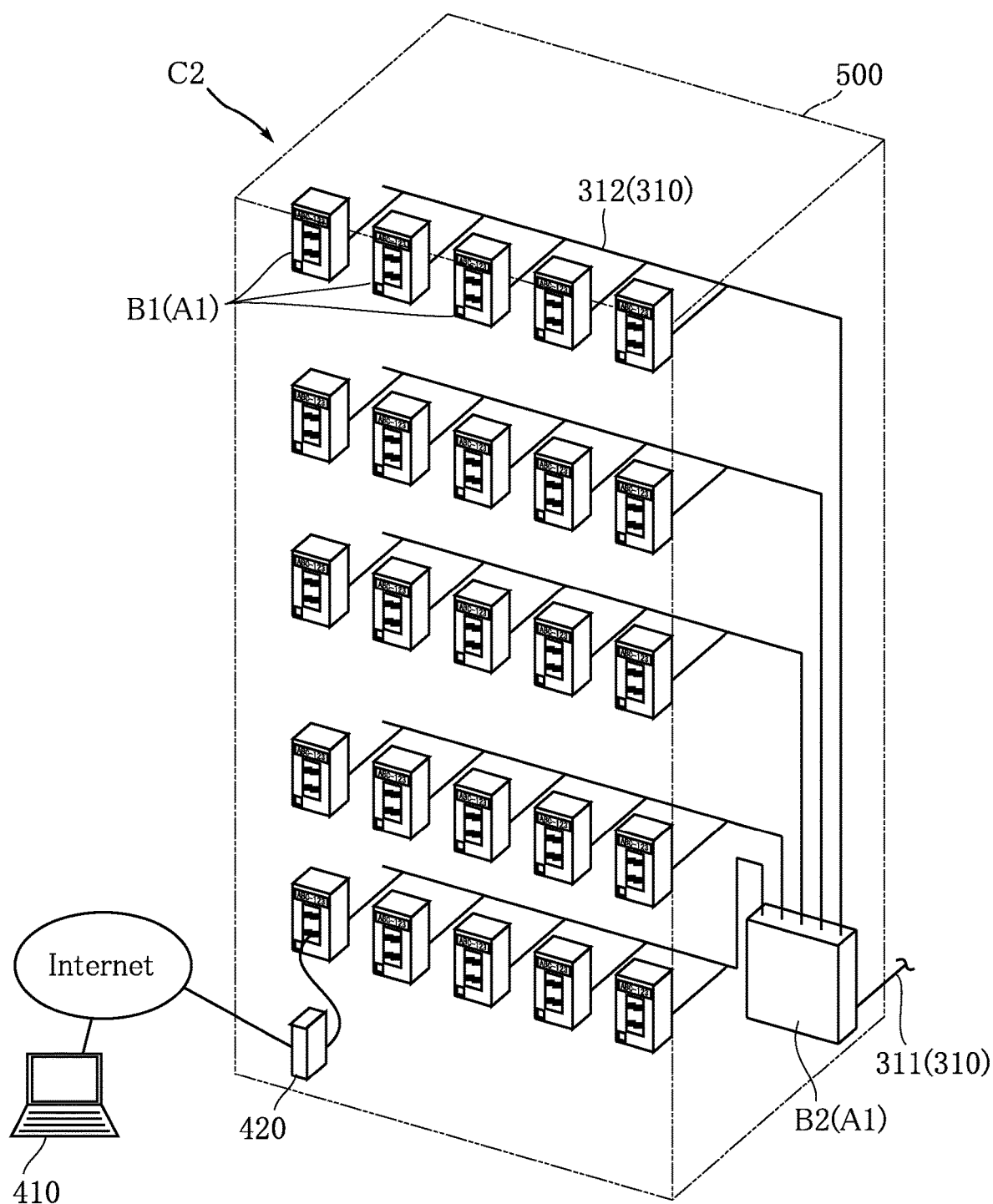
FIG. 17 is a schematic diagram showing an earthquake sensing system based on a second embodiment of the present disclosure.
Figure 18:
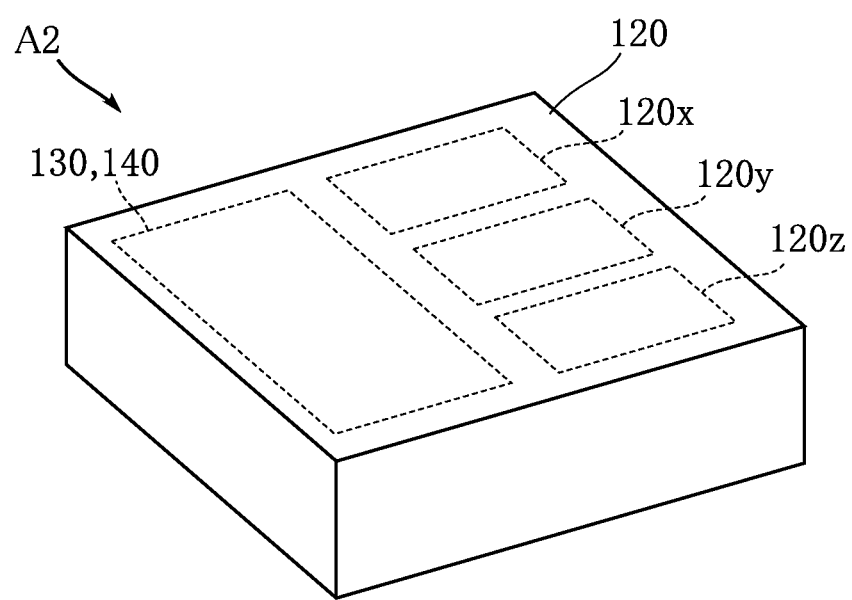
FIG. 18 is a schematic diagram showing the earthquake sensing module based on the second embodiment of the present disclosure.

FIGS. 17 and 18 show another embodiment of the present disclosure. Note that in these diagrams, elements that are the same as or similar to those in the above-described embodiment are denoted by reference signs that are the same as those used in the above-described embodiment.

In an earthquake sensing system C2 shown in FIG. 17, a system control unit 410 is connected to the Internet, which is outside of the building 500. The earthquake sensing apparatus B1 and the earthquake sensing apparatus B2 in the building 500 are connected to the Internet via the PLC communication apparatus 420. For this reason, for example, the state information comparison mode M4 described with reference to FIGS. 15 and 16 can be executed by the system control unit 410 arranged at a remote location outside of the building 500. Accordingly, remote monitoring of the building 500 can be enhanced.

FIG. 18 shows an earthquake sensing module based on the second embodiment of the present disclosure. The earthquake sensing module A2 of the present embodiment does not include the module substrate 110 of the earthquake sensing module A1, but the acceleration sensor 120 has the external appearance of the earthquake sensing module A2.

In the present embodiment, the module control unit 130 and the module storage unit 140 are built in the acceleration sensor 120. As the module control unit 130 and the module storage unit 140 built in the acceleration sensor 120, it is preferable to use a configuration that is smaller and thinner than that of the module control unit 130 and the module storage unit 140 equipped in the module substrate 110 in the earthquake sensing module A1. In the present embodiment, an ASIC (application specific integrated circuit) that can fulfill the functions of the above-described module control unit 130 and module storage unit 140 is used. The ASIC is an integrated circuit element whose function is narrowed down by specializing in a specific application, such as the earthquake sensing application of the present embodiment. For this reason, the ASIC is suitable for reducing the size and thickness, and can be built in the acceleration sensor 120 as a constituent portion that fulfills the functions of the module control unit 130 and the module storage unit 140.

Note that if an ASIC serving as the module control unit 130 and the module storage unit 140 is built-in, it is arranged adjacent to an x-axis detection unit 120x, a y-axis detection unit 120y, and a z-axis detection unit 120z, as shown in the drawings, for example. The x-axis detection unit 120x, the y-axis detection unit 120y, and the z-axis detection unit 120z correspond to MEMS sensors that can detect acceleration on each axis. The measurement principles and specific structures of the x-axis detection unit 120x, the y-axis detection unit 120y, and the z-axis detection unit 120z are not particularly limited.

The detection processing performed by the earthquake sensing module A2 need only employ the processing described with reference to FIGS. 8 to 10, as appropriate. Note that if the storage capacity of the ASIC is limited, it is sufficient to adopt a storage amount reduction measure, such as reducing the number of instances of history storage in the earthquake detection processing, for example.

According to the present embodiment as well, it is possible to achieve an increase in the functionality of the earthquake sensing module A2. Also, the external appearance of the acceleration sensor 120 is the external appearance of the earthquake sensing module A2, due to using a configuration in which the module control unit 130 and the module storage unit 140 are built in the acceleration sensor 120. For this reason, the earthquake sensing module A2 is suitable for achieving an even smaller size compared to the earthquake sensing module A1. This kind of size reduction is advantageous in that when the earthquake sensing module A2 is incorporated in e.g., the earthquake sensing apparatus B1, it can be mounted in a greater variety of orientations in a wider range of positions.

The earthquake sensing module and the earthquake sensing system according to the present disclosure is not limited to the above-described embodiment. The specific configuration of each unit of the earthquake sensing module and the earthquake sensing system according to the present disclosure can be subjected to various types of design changes.

Hereinafter, appendixes of the present disclosure will be given.

APPENDIX 1

An earthquake sensing module including:
an acceleration sensor configured to detect accelerations on a plurality of detection axes;
a module control unit configured to control the acceleration sensor; and
a module storage unit configured to store state information of the acceleration sensor.

APPENDIX 2

The earthquake sensing module according to appendix 1, wherein the state information is the accelerations on the plurality of detection axes at a time when no vibration is occurring.

APPENDIX 3

The earthquake sensing module according to appendix 2, wherein
the module control unit calculates a gravity direction based on the accelerations on the plurality of detection axes at a time when no vibration is occurring, and
the state information includes the gravity direction at a time when no vibration is occurring.

APPENDIX 4

The earthquake sensing module according to appendix 3, wherein the module control unit has an initial state storage mode in which the state information of the acceleration sensor is stored in the module storage unit as initial state information.

APPENDIX 5

The earthquake sensing module according to appendix 4, wherein the module control unit performs self-diagnosis processing for executing diagnosis of the acceleration sensor according to a change in state of the acceleration sensor corresponding to a change in a predetermined condition.

APPENDIX 6

The earthquake sensing module according to appendix 4 or 5, wherein the module control unit has a vibration measurement mode for measuring vibration based on the accelerations on the plurality of detection axes.

APPENDIX 7

The earthquake sensing module according to appendix 6, wherein in the vibration measurement mode, the module control unit performs signal sensing processing for determining whether or not there is vibration by adding up differences between the accelerations on the plurality of detection axes and the accelerations stored as the initial state and comparing the sum obtained through the adding and a pre-determined acceleration threshold.

APPENDIX 8

The earthquake sensing module according to appendix 6 or 7, wherein the module control unit calculates an SI value based on the accelerations on the plurality of detection axes.

APPENDIX 9

The earthquake sensing module according to appendix 8, wherein the vibration measurement mode includes first digitization processing in which the module control unit samples the accelerations of the acceleration sensor at a first sampling rate.

APPENDIX 10

The earthquake sensing module according to appendix 9, wherein the first digitization processing includes first selection processing for selecting vibration with a first frequency or less.

APPENDIX 11

The earthquake sensing module according to appendix 10, wherein in the vibration measurement mode, the module control unit calculates a maximum acceleration based on the acceleration data obtained through the first digitization processing.

APPENDIX 12

The earthquake sensing module according to appendix 11, wherein
the vibration measurement mode includes second digitization processing in which the module control unit samples the acceleration data obtained through the first digitization processing at a second sampling rate, which is a lower frequency than the first sampling rate, and
the module control unit calculates an SI value based on the acceleration data obtained through the second digitization processing.

APPENDIX 13

The earthquake sensing module according to appendix 12, wherein the second digitization processing includes second selection processing for selecting vibration with a second frequency or less, the second frequency being a lower frequency than the first frequency.

APPENDIX 14

The earthquake sensing module according to any one of appendixes 8 to 13, wherein the module control unit has an earthquake sensing signal output determination mode for determining whether or not an earthquake sensing signal is to be output, based on the SI value calculated in the vibration measurement mode.

APPENDIX 15

The earthquake sensing module according to appendix 14, wherein the earthquake sensing signal output determination mode includes first determination processing in which determination is performed by comparing the calculated SI value and an SI value threshold value.

APPENDIX 16

The earthquake sensing module according to appendix 15, wherein the earthquake sensing signal output determination mode includes second determination processing in which determination is performed by comparing an instance count of instances in which the calculated SI value has exceeded the SI value threshold value within a predetermined amount of time, and an instance count threshold value.

APPENDIX 17

The earthquake sensing module according to appendix 16, wherein the earthquake sensing signal output determination mode includes third determination processing in which determination is performed by comparing an integrated value of SI values in a predetermined amount of time, and an integrated SI value threshold value.

APPENDIX 18

The earthquake sensing module according to any one of appendixes 1 to 17, further including a module substrate on which the acceleration sensor and the module control unit are mounted.

APPENDIX 19

An earthquake sensing system, including:
a plurality of earthquake sensing apparatuses each including the earthquake sensing module according to any one of appendixes 4 to 18;
a communication network through which the plurality of earthquake sensing apparatuses are connected; and
a system control unit connected to the communication network.

APPENDIX 20

The earthquake sensing system according to appendix 19, wherein the communication network is a power line communication network.

APPENDIX 21

The earthquake sensing system according to appendix 20, wherein the earthquake sensing apparatus further includes a cutoff unit configured to cut off a power supply from a power line.

APPENDIX 22

The earthquake sensing system according to appendix 21, wherein the earthquake sensing apparatus further includes a power outlet portion that is connected to a power line and into which a plug is to be inserted.

APPENDIX 23

The earthquake sensing system according to appendix 22, wherein the earthquake sensing apparatus further includes a power conversion unit configured to convert power from the power line into power that is suitable for the earthquake sensing module.

APPENDIX 24

The earthquake sensing system according to appendix 23, wherein the power conversion unit includes an electronic component and a power substrate on which the electronic component is mounted.

APPENDIX 25

The earthquake sensing system according to appendix 24, wherein the earthquake sensing module and the power conversion unit are arranged in alignment in an insertion direction of inserting the plug into the power outlet portion.

APPENDIX 26

The earthquake sensing module according to any one of appendixes 19 to 25, wherein the system control unit has a state information comparison mode in which the state information and the initial state information of the plurality of earthquake modules are compared.

APPENDIX 27

The earthquake sensing system according to appendix 26, wherein in the state information comparison mode, the system control unit detects an orientation change with respect to the gravity direction of the plurality of earthquake sensing modules through comparison of the gravity direction in the state information at a certain time and the gravity direction in the initial state information.

The invention claimed is:
1. An earthquake sensing module comprising:
an acceleration sensor configured to detect accelerations on a plurality of detection axes:
a module control unit configured to control the acceleration sensor; and
a module storage unit configured to store state information of the acceleration sensor,
wherein the module control unit has an initial state storage mode in which the state information of the acceleration sensor is stored in the module storage unit as initial state information, the module control unit has a vibration measurement mode for measuring vibration based on the accelerations on the plurality of detection axes, and in the vibration measurement mode, the module control unit performs signal sensing processing for determining whether or not there is vibration by adding up differences between the accelerations on the plurality of detection axes and the accelerations stored as the initial state information and comparing a sum obtained through the adding with a pre-determined acceleration threshold.

2. The earthquake sensing module according to claim 1, wherein the state information is the accelerations on the plurality of detection axes at a time when no vibration is occurring.

3. The earthquake sensing module according to claim 2, wherein
the module control unit calculates a gravity direction based on the accelerations on the plurality of detection axes at a time when no vibration is occurring, and
the state information includes the gravity direction at a time when no vibration is occurring.

4. The earthquake sensing module according to claim 1, wherein the module control unit performs self-diagnosis processing for executing diagnosis of the acceleration sensor according to a change in state of the acceleration sensor corresponding to a change in a predetermined condition.

5. The earthquake sensing module according to claim 1, wherein the module control unit calculates an SI value based on the accelerations on the plurality of detection axes, the SI value being a numerical index indicating a level of damage caused by vibration.

6. The earthquake sensing module according to claim 5, wherein the vibration measurement mode includes first digitization processing in which the module control unit samples the accelerations of the acceleration sensor at a first sampling rate.

7. The earthquake sensing module according to claim 6, wherein the first digitization processing includes first selection processing for selecting vibration with a first frequency or less.

8. The earthquake sensing module according to claim 7, wherein in the vibration measurement mode, the module control unit calculates a maximum acceleration based on the acceleration data obtained through the first digitization processing.

9. The earthquake sensing module according to claim 8, wherein
the vibration measurement mode includes second digitization processing in which the module control unit samples the acceleration data obtained through the first digitization processing at a second sampling rate, which is a lower frequency than the first sampling rate, and
the module control unit calculates the SI value based on the acceleration data obtained through the second digitization processing.

10. The earthquake sensing module according to claim 9, wherein the second digitization processing includes second selection processing for selecting vibration with a second frequency or less, the second frequency being a lower frequency than the first frequency.

11. The earthquake sensing module according to claim 5, wherein the module control unit has an earthquake sensing signal output determination mode for determining whether or not an earthquake sensing signal is to be output, based on the SI value calculated in the vibration measurement mode.

12. The earthquake sensing module according to claim 11, wherein the earthquake sensing signal output determination mode includes first determination processing in which determination is performed by comparing the calculated SI value and an SI value threshold value.

13. The earthquake sensing module according to claim 12, wherein the earthquake sensing signal output determination mode includes second determination processing in which determination is performed by comparing an instance count of instances in which the calculated SI value has exceeded the SI value threshold value within a predetermined amount of time, and an instance count threshold value.

14. The earthquake sensing module according to claim 13, wherein the earthquake sensing signal output determination mode includes third determination processing in which determination is performed by comparing an integrated value of SI values in a predetermined amount of time, and an integrated SI value threshold value.

15. The earthquake sensing module according to claim 1, further comprising a module substrate on which the acceleration sensor and the module control unit are mounted.

16. An earthquake sensing system, comprising:
a plurality of earthquake sensing apparatuses each including the earthquake sensing module according to claim 1;
a communication network through which the plurality of earthquake sensing apparatuses are connected; and
a system control unit connected to the communication network.

17. The earthquake sensing system according to claim 16, wherein the communication network is a power line communication network.

18. The earthquake sensing system according to claim 17, wherein the earthquake sensing apparatus further includes a cutoff unit configured to cut off a power supply from a power line.

19. The earthquake sensing system according to claim 18, wherein the earthquake sensing apparatus further includes a power outlet portion that is connected to a power line and into which a plug is to be inserted.

20. The earthquake sensing system according to claim 19, wherein the earthquake sensing apparatus further includes a power conversion unit configured to convert power from the power line into power that is suitable for the earthquake sensing module.

21. The earthquake sensing system according to claim 20, wherein the power conversion unit includes an electronic component and a power substrate on which the electronic component is mounted.

22. The earthquake sensing system according to claim 21, wherein the earthquake sensing module and the power conversion unit are arranged along an insertion direction of inserting the plug into the power outlet portion.

23. The earthquake sensing system according to claim 16, wherein the system control unit has a state information comparison mode in which the state information and the initial state information of the plurality of earthquake modules are compared.

24. The earthquake sensing system according to claim 23, wherein
in the state information comparison mode, the system control unit detects an orientation change with respect to a gravity direction of the plurality of earthquake sensing modules through comparison of a gravity direction in the state information at a certain time and a gravity direction in the initial state information.

* * * * *